(12) United States Patent
Warshofsky et al.

(10) Patent No.: US 8,019,950 B1
(45) Date of Patent: Sep. 13, 2011

(54) MEMORY CONTROLLER INTERFACE FOR AN EMBEDDED PROCESSOR BLOCK CORE IN AN INTEGRATED CIRCUIT

(75) Inventors: Alex S. Warshofsky, Miami Beach, FL (US); Ahmad R. Ansari, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 689 days.

(21) Appl. No.: 12/056,954

(22) Filed: Mar. 27, 2008

(51) Int. Cl.
*G06F 13/00* (2006.01)

(52) U.S. Cl. ......................................... 711/154; 710/310

(58) Field of Classification Search ........................ None
See application file for complete search history.

(56) References Cited

U.S. PATENT DOCUMENTS

| | | | |
|---|---|---|---|
| 5,923,860 A * | 7/1999 | Olarig | 710/306 |
| 6,574,691 B1 * | 6/2003 | Jirgal et al. | 710/100 |
| 2007/0129926 A1 * | 6/2007 | Verheyen et al. | 703/15 |

OTHER PUBLICATIONS

U.S. Appl. No. 12/043,097, filed Mar. 5, 2008, Ansari, Ahmad R., et al., entitled "A Processor Block Asic Core for Embedding in an Integrated Circuit", Xilinx, Inc. 2100 Logic Drive, San Jose, California 95124.

UG200 (v1.0) "Embedded Processor Block in Virtex-5 FPGAs", Jan. 15, 2008, 323 pages, Xilinx, Inc. 2100 Logic Drive, San Jose, CA 95124.

UG200 (v1.1), "Embedded Processor Block in Virtex-5 FPGAs", Mar. 31, 2008, 327 pages, Xilinx, Inc. 2100 Logic Drive, San Jose, CA 95124.

* cited by examiner

*Primary Examiner* — Denise Tran

(74) *Attorney, Agent, or Firm* — W. Eric Webostad; Kevin T. Cuenot

(57) ABSTRACT

A method for address acknowledgement is described. A memory controller interface is embedded as part of an embedded core in a host integrated circuit. Access to the memory controller interface is arbitrated with an arbiter. An accept signal is sent from the memory controller interface to the arbiter to indicate whether the memory controller interface is ready to receive a transaction. Access to the memory controller interface is requested by a master device for passing the transaction to a memory controller via the arbiter. The arbiter is a proxy for the memory controller interface responsive to the accept signal being asserted. An acknowledgement signal is sent from the arbiter as a proxy for the memory controller interface responsive to receipt of the transaction and the accept signal being asserted.

12 Claims, 21 Drawing Sheets

MEMORY CONTROLLER INTERFACE FOR AN EMBEDDED PROCESSOR BLOCK CORE IN AN INTEGRATED CIRCUIT

FIELD OF THE INVENTION

The invention relates to integrated circuit devices ("ICs"). More particularly, one or more aspects generally relate to a memory controller interface for an embedded processor block core in an IC.

BACKGROUND OF THE INVENTION

Programmable logic devices ("PLDs") are a well-known type of integrated circuit that can be programmed to perform specified logic functions. One type of PLD, the field programmable gate array ("FPGA"), conventionally includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile conventionally includes both programmable interconnect and programmable logic. The programmable interconnect conventionally includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic conventionally may be programmed by loading a stream of configuration data into internal configuration memory cells that define how the programmable elements are configured. The configuration data can be read from memory (e.g., from an external non-volatile memory, such as flash memory or read-only memory) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is conventionally stored on-chip in non-volatile memory. In some CPLDs, configuration data is stored on-chip in non-volatile memory, then downloaded to volatile memory as part of an initial configuration ("programming") sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Conventionally, embedded processors are designed apart from the PLDs. Such embedded processors are generally not specifically designed for implementation in PLDs, and thus such embedded processors may have operating frequencies that significantly exceed a maximum operating frequency of programmable logic of such PLDs. Moreover, parameters designed into the embedded processors, such as latency, transistor gate delay, data throughput, and the like, may be assumed to be present in the environment to which the embedded processors are to be coupled. Thus, even though a PLD may include an embedded processor, such one or more operating parameters of the embedded processor may be substantially disparate from those of programmable logic of the PLD.

For purposes of clarity by way of example and not limitation, an FPGA with an embedded processor is described; however, it should be appreciated that other PLDs, as well as other integrated circuits with programmable logic or other circuitry fabric with less performance than the embedded processor, may likewise be used in accordance with the following description.

Performance of a design instantiated in programmable logic of an FPGA ("FPGA fabric") coupled to an embedded processor may be significantly limited by disparity between operating parameters of the FPGA fabric and those of the embedded processor. Thus, if, as in the past, embedded processor interfaces such as processor local bus ("PLB") interfaces are brought directly out to FPGA fabric, disparity between respective operating parameters of the embedded processor and the FPGA fabric is a significant limitation with respect to overall performance. For example, operations between a memory controller instantiated in FPGA fabric and an embedded processor have heretofore been significantly bottlenecked due to having to wait on the slower memory controller.

Alternatively, to enhance performance, a memory controller instantiated in FPGA fabric may be hardened or provided as an ASIC core coupled to the embedded processor. By hardening a circuit instantiated in FPGA fabric, it is generally meant replacing or bypassing configuration memory cells with hardwired or dedicated connections. Even though the example of a memory controller is used, it should be understood that other peripherals may be hardened or provided as ASIC cores for coupling to an embedded processor. However, as the memory controller or peripheral ASIC or hardened core is not configurable, this reduces overall flexibility. For purposes of clarity by way of example and not limitation, ASIC cores are described even though hardened cores instantiated in FPGA fabric may also be used.

Semiconductor processes and semiconductor process integration rules ("semiconductor process design rules") associated with ASICs are generally more challenging than those associated with FPGAs, and thus yield for such ASICs may be relatively low as compared to yield of FPGAs of the same size. FPGAs, which may have a larger and longer run rate than ASICs, may employ semiconductor process design rules that are less aggressive but are more conducive to a higher die per wafer yield than that of ASICs.

It should be understood that an FPGA manufactured with an ASIC core uses FPGA semiconductor process design rules. Thus, ASIC cores manufactured in FPGAs perform worse than such ASIC cores manufactured as standalone ASICs using more aggressive ASIC semiconductor process design rules. Thus, manufacturing FPGAs with ASIC cores conventionally will not achieve competitive performance with standalone ASICs.

For FPGAs provided with ASIC cores that take the place of some FPGA fabric resources, users conventionally are locked into the particular offering of ASIC core memory controllers or peripherals, and have less flexibility of design due to fewer FPGA fabric resources for implementing their circuit design. This loss of flexibility, combined with the fact that such ASIC core memory controllers or peripherals implemented in FPGA fabric, may make FPGAs less attractive to users.

Accordingly, it would be desirable and useful to enhance performance of FPGAs without a significant loss of design flexibility associated with adding ASIC cores such as memory controllers or peripherals.

SUMMARY OF THE INVENTION

One or more aspects generally relate to a memory controller interface for a processor block Application Specific Integrated Circuit ("ASIC") core for embedding in an IC having programmable logic.

An aspect relates generally to a method for address acknowledgement. A memory controller interface is embedded as part of an embedded core in a host integrated circuit. Access to the memory controller interface is arbitrated with an arbiter. An accept signal is sent from the memory controller interface to the arbiter to indicate whether the memory controller interface is ready to receive a transaction. Access to the memory controller interface is requested by a master device for passing the transaction from the master device to a memory controller via the arbiter and the memory controller interface. Such request is made to the arbiter for access to the memory controller interface. The arbiter is a proxy for the memory controller interface responsive to the accept signal being asserted. An acknowledgement signal is sent from the arbiter as the proxy for the memory controller interface responsive to receipt of the transaction.

Another aspect relates generally to a memory controller interface. The memory controller interface is part of a processor block core embedded in a host integrated circuit having programmable logic for communication with a memory controller. The memory controller is instantiated in the programmable logic. The memory controller interface has an output path including a first processor block interface, an address queue, a write data queue, a first translation circuit. The first processor block interface is coupled to receive address input and data input. The address input is provided from the processor block interface to the address queue. The data input is provided from the processor block interface to the write data queue. The first translation circuit is coupled to receive the address input from the address queue and coupled to receive the write data input from the write data queue. The memory controller has an input path including a second processor block interface, a read data queue and a second translation circuit. The input path is coupled to receive read data via the memory controller for the second translation circuit. The second translation circuit is coupled to provide the read data to the read data queue. The read data queue is coupled to provide the read data to the second processor block interface for output therefrom.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
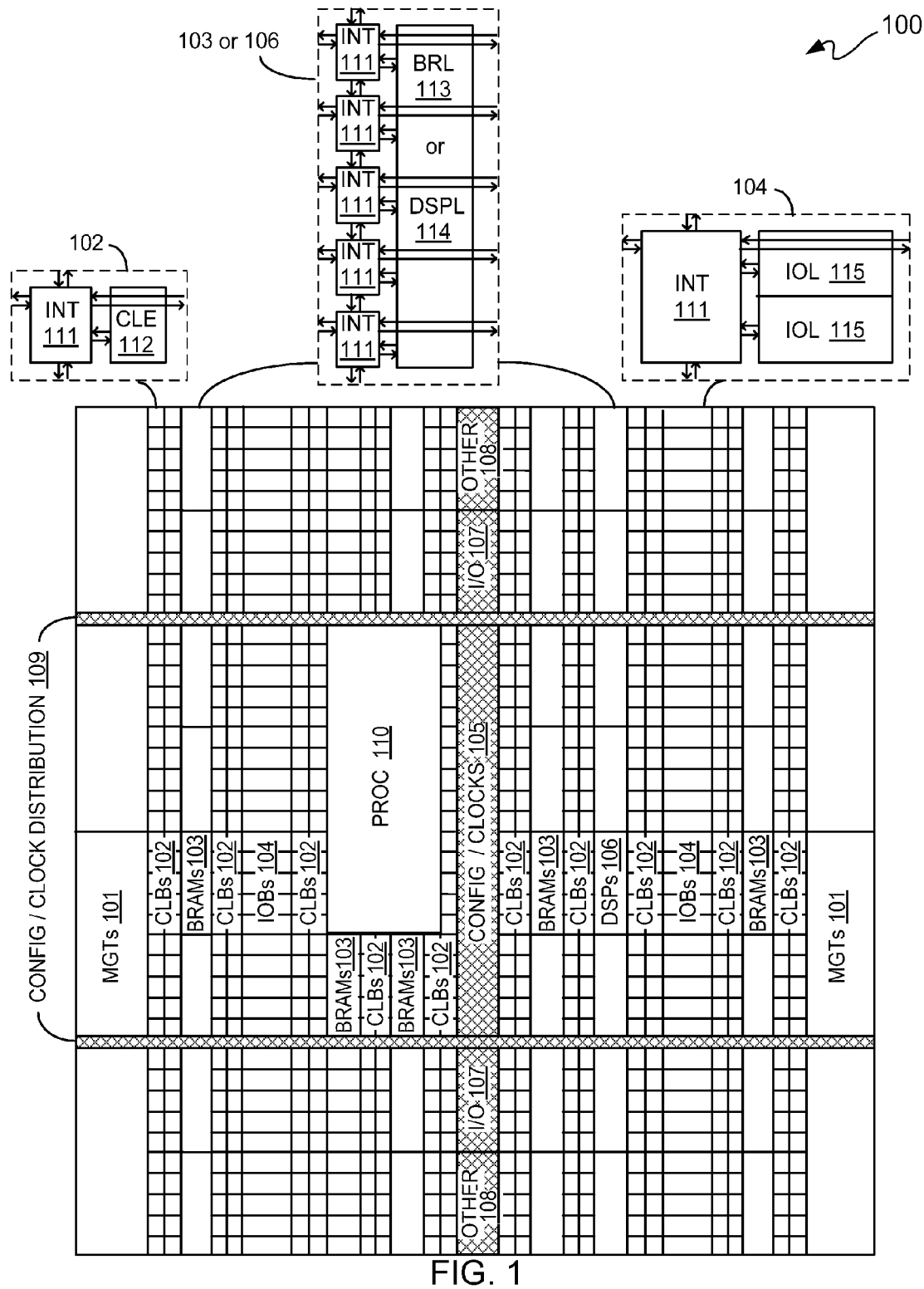
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of pre-developed blocks of logic have been developed that can be included in an FPGA design. Such library modules include, for example, adders, multipliers, filters, and other arithmetic and DSP functions from which complex designs can be readily constructed. These pre-developed logic blocks are in the form of coded text that may be instantiated in programmable logic of the FPGA. The use of pre-developed logic blocks permits faster design cycles, by eliminating the redesign of duplicated circuits. Further, such blocks are typically well tested, thereby making it easier to develop a reliable complex design.

Thus, some FPGAs, such as the Virtex-5™ FGPA available from Xilinx, Inc. of San Jose, Calif., can be programmed to incorporate pre-developed logic blocks with pre-designed functionalities, i.e., "soft cores." A soft core can include a predetermined set of configuration bits that program the FPGA to perform one or more functions. Alternatively, a soft core can include source code or schematics that describe the logic and connectivity of a design. Typical soft cores can provide, but are not limited to, DSP functions, memories, storage elements, and math functions. Some soft cores include an optimally floor-planned layout targeted to a specific family of FPGAs. Soft cores can also be parameterizable, i.e., allowing the user to enter parameters to activate or change certain soft core functionality.

A set or sets of configuration bits used to program programmable logic of an FPGA is conventionally referred to as a configuration bitstream. Programmable logic of an FPGA may include CLBs, PIPs, IOBs, or other programmably configurable logic blocks, interconnects, or inputs/outputs by a configuration bitstream. Register settings may be set via a configuration bitstream; however, hardwired registers are not programmable logic.

Moreover, a hardwired core, such as an ASIC core, is not a soft core. A soft core is instantiated in programmable logic after manufacture of an integrated circuit, whereas a hardwired core is manufactured as part of an integrated circuit. Furthermore, conventionally a hardwired core is thought of as having generally dedicated logic blocks, interconnects, and inputs/outputs, even though a portion of a hardwired core may be set to operate responsive to register settings.

Figure 2:
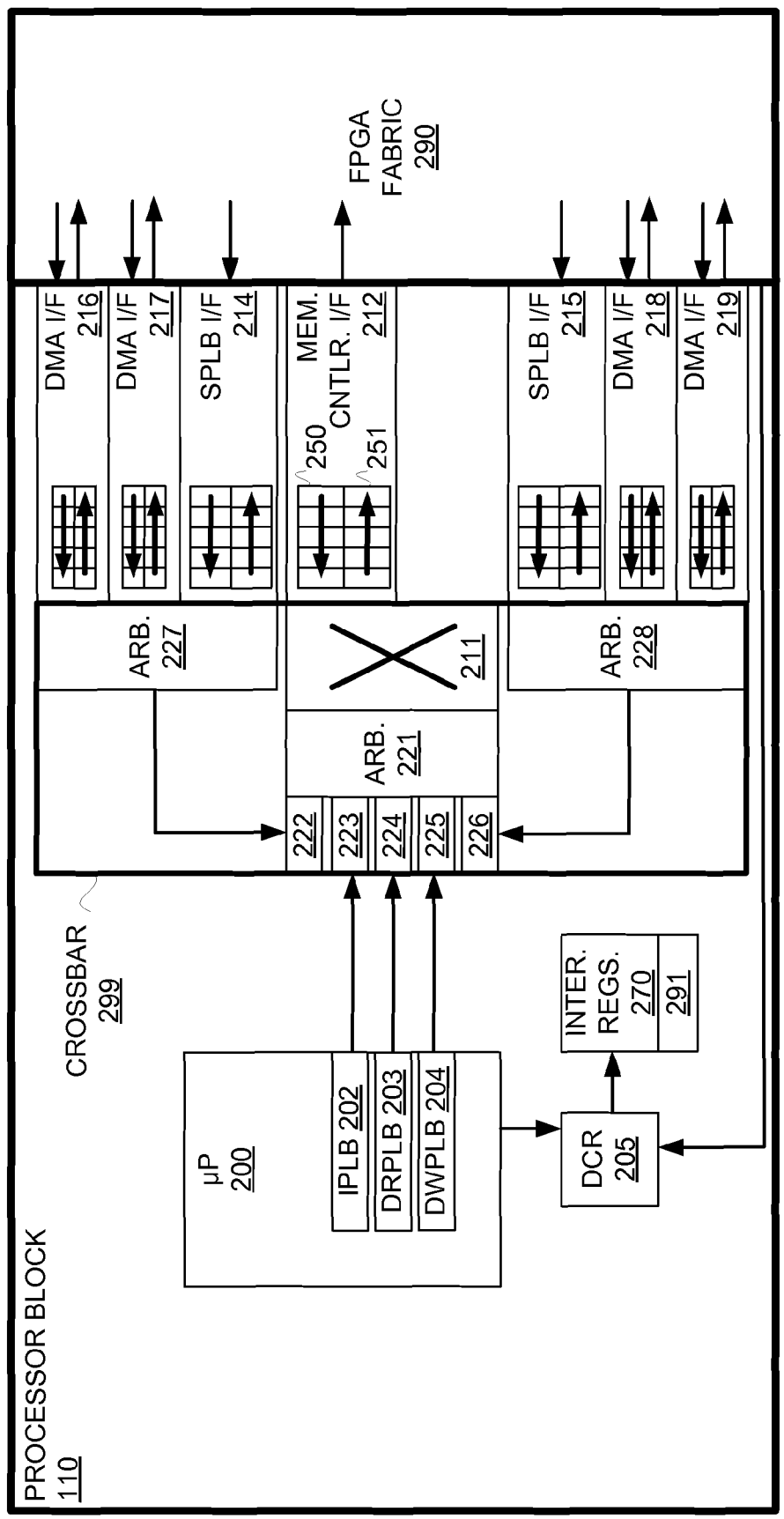
FIG. 2 is a block diagram depicting an exemplary embodiment of an ASIC processor block core ("processor block") embedded in the FPGA of FIG. 1.

FIG. 2 is a block diagram depicting an exemplary embodiment of an ASIC processor block core ("processor block") 110. Processor block 110 includes an embedded microprocessor core, namely microprocessor 200, which is generally hardwired and designed apart from the FPGA, such as FPGA 100 of FIG. 1, in which processor block 110 may be located.

Microprocessor 200 in this exemplary embodiment includes an instruction processor local bus ("IPLB") 202, a data read PLB ("DRPLB") 203, and a data write PLB ("DWPLB") 204. In this exemplary embodiment, microprocessor 200 is a Power PC, or more particularly a 440 Power PC, available from IBM. However, from the following description, it should be appreciated that other types of microprocessors with other types of interfaces may be used. Moreover, from the following description, it should be appreciated that an ASIC core other than a microprocessor ASIC core may be used.

Components of processor block 110 are generally hardwired such that their performance exceeds that of programmable logic of FPGA fabric 290 to which processor block 110 is coupled. Processor block 110 includes registers, such as internal registers 270, which may be set in order to condition processor block 110 for any of a variety of user selectable configurations, as described below in additional detail. Memory cells 291 may be set with default values for configuring internal registers 270.

A device control register block ("DCR") 205 may be coupled to microprocessor core 200 and may be part of processor block 110. DCR 205 may be used to provide settings to registers controlled by microprocessor core 200 or other registers subject to control by DCR block 205. DCR block 205 may be used to set registers of internal registers 270.

A crossbar 299 is part of processor block 110. Crossbar 299 includes address decoder blocks ("decoders") 222 through 226, arbitration block ("arbiter") 221, crossbar switch ("switch") 211, and arbitration blocks ("arbiters") 227 and 228. IPLB 202, DRPLB 203, and DWPLB 204 are respectively coupled to decoders 223 through 225. Decoders 222 through 226 are respectively coupled to arbiter 221. Arbiter 221 is coupled to switch 211. Decoders 222 through 226 decode addresses associated with transactions, and transactions with decoded addresses are provided to arbiter 221 for arbitrating access to switch 211. The decoded addresses for transactions having been granted access to switch 211 are used to route such transactions to memory controller interface 212.

Arrows in FIG. 2 indicate the direction of a transaction. One or more master devices (not illustratively shown in FIG.

2), other than microprocessor 200, may be instantiated in FPGA fabric 290, may be other ASIC cores of FPGA 100, or may be external ICs coupled to FPGA 100, or any combination thereof. Such master devices external to processor block 110 may be coupled thereto via a direct memory access ("DMA") interface block, such as DMA interface blocks ("DMA interfaces") 216 through 219, or a slave PLB interface block ("SPLB interface"), such as SPLB interfaces 214 and 215. Thus, with respect to transaction origination, DMA interfaces 216 through 219 and SPLB interfaces 214 and 215 may generally be thought of as FPGA fabric 290-to-crossbar 299 bridges, and memory controller interface block ("memory controller interface") 212 may generally be thought of as crossbar 299-to-FPGA fabric 290 bridge.

Transactions may be initiated by microprocessor 200 as indicated by arrows respectively from IPLB 202, DRPLB 203, and DWPLB 204. However, it should be understood that a transaction issued by microprocessor 200 may result in data being provided to microprocessor 200 responsive to such an issued transaction.

Crossbar switch 211 is coupled to memory controller interface 212. Memory controller interface 212 may be coupled to FPGA fabric 290. Memory controller interface 212 includes an inbound first-in, first-out buffer ("FIFO") 250 and an outbound FIFO 251. Thus, even though the direction of a transaction is directed to memory controller interface 212 such as originating from microprocessor 200 or FPGA fabric 290, it should be appreciated that data or other information flow associated with such a transaction may be in either or both input and output directions. Thus, crossbar 299 is bidirectional, as described below in additional detail. Because processor block 110 is an ASIC core, blocks of processor block 110 that couple to microprocessor 200 may be tailored for interoperability as well as performance. Focusing on communication between microprocessor 200 and memory external to processor block 110, memory controller interface 212 is designed and manufactured to operate at the rated speed of microprocessor 200. Even though memory controller interface 212 may be clocked at the same frequency as microprocessor 200, microprocessor 200 may be clocked at a higher rate than memory controller interface 212. Thus, for example there may be a 1:1 clock ratio between memory controller interface 212 and a memory interface instantiated in programmable logic coupled to such memory controller interface 212; however, the clock ratio between microprocessor 200 and memory controller interface 212 may be other than 1:1; for example 3:2. Moreover, because of hardwiring associated with an ASIC core, it should be appreciated that latency associated with signal propagation in crossbar 299 and memory controller interface 212 is substantially less than latency in FPGA fabric 290. In other words, by providing an ASIC core with memory controller interface 212 coupled to microprocessor 200, frequency of operation has been increased with a reduction in latency as compared with having microprocessor 200 directly coupled to FPGA fabric 290.

Moreover, handshaking conventionally associated with a bus layer of a memory controller has been incorporated into memory controller interface 212. Additionally, some functionality conventionally associated with a physical ("PHY") layer of a memory controller is incorporated into memory controller interface 212. These additional functions include address decoding, row and bank detection, transaction reordering, data bus width translation, and burst width translation. Row and bank detection allows users to set masks to allow memory controller interface 212 to provide advanced notice of a row or bank miss to a memory controller coupled thereto. Such a miss may cause a stall state, such as time for opening a new page in memory by the memory controller. Accordingly, the memory controller may provide a ready/not ready signal to memory controller interface 212 to on/off throttle output of data therefrom. So, for example, opening and closing a page or pages in memory is not handled by memory controller interface 212, and is left to a memory controller which may be instantiated in FPGA fabric 290 as determined by a user. Internal registers of internal registers 270 may be set to configure memory controller interface 212.

Memory controller interface 212, prior to setting register bits, does not recognize whether the memory controller is a quad data rate ("QDR"), or double data rate ("DDR"), or single data rate ("SDR"), or some other form of memory. Moreover, memory controller interface 212, prior to setting register bits, does not recognize whether the memory controller is for static random access memory ("SRAM") including BRAM, dynamic random access memory ("DRAM"), read-only memory ("ROM"), flash, or some other type of memory.

Depth of FIFOs 250 and 251 of memory controller interface 212 is fixed, and such depth is sufficient to at least accommodate latency associated with crossbar 290. In other words, depth of FIFOs 250 and 251 is sufficient to handle operations on every cycle of a clock signal (not shown for purposes of clarity), which may be at a frequency of operation of microprocessor 200. Thus, for example, a memory controller instantiated in FPGA fabric 290 coupled to memory controller interface 212 may be configured to send out a "beat" of data on each cycle of operation without any "bubbles."

For purposes of clarity by way of example and not limitation, some numerical examples of bus widths are provided. However, it should be understood that these or other bus widths may be used as may vary from application to application.

If a user decides to burst 1, 2, 4, or 8 quad words at a time, where a word is 32 bits, memory controller interface 212 may be configured to output such quad word bursts. Within processor block 110, the data width of memory controller interface 212 is 128 bits; however, for communication with FPGA fabric 290, the data width of memory controller interface 212 with respect to interfacing to FPGA fabric 290 or otherwise externally coupling with respect to processor block 110 is user selectable, such as for a 32-, 64-, or 128-bit wide interface. Variable bus sizing of memory controller interface 212 to FPGA fabric 290 is facilitated in part by a bus formed using PIPs of FPGA fabric 290. As shall be appreciated from the following description, any combination of 32-, 64-, and 128-bit soft buses associated with memory controller interface 212 may communicate with any 32-, 64-, and 128-bit soft buses associated with SPLB interfaces 214 and 215. Furthermore, memory controller interface 212 supports various clocking ratios with respect to frequency of microprocessor 200, examples of such microprocessor-to-memory controller interface clocking ratios may include 1:1, 3:2, and 2:1.

Effectively, by providing FIFOs 250 and 251, memory controller interface 212 is a FIFO-like port which is clocked at the operating rate of microprocessor 200. There may be as little as a two clock cycle latency, subject to port availability, for sending a decoded address and transaction from crossbar 299 across memory controller interface 212, namely one clock cycle for a FIFO and one clock cycle for a synchronizer. Likewise, there may be as little as a one clock cycle latency across crossbar 299 that is applicable to all accesses to crossbar 299 subject to port availability, and this latency of one clock cycle is of a rated speed of operation of microprocessor 200.

Thus, a user design may instantiate a memory controller in FPGA fabric 290 according to the type of memory to be coupled to such memory controller as selected by the user. Accordingly, flexibility for a user design or selection of a memory controller instantiated in FPGA fabric 290 is maintained while performance is enhanced.

Memory controller interface 212 may be thought of as having only one slave device coupled to it, namely memory coupled to it via a memory controller. Furthermore, such a memory controller for interfacing to memory may be substantially simplified as the PHY layer of such memory controller may be directly interfaced with memory controller interface 212.

Memory controller interface 212 is a "slave" interface with respect to microprocessor 200, DMA interfaces 216 through 219, and SPLB interfaces 214 and 215, as memory controller interface 212 services microprocessor 200, and one or more master devices (not shown) coupled via DMA interfaces 216 through 219 or SPLB interfaces 214 and 215.

Memory controller interface 212 is a master interface with respect to "slave" devices coupled thereto via busing external to processor block 110. DMA interfaces 216 through 219 are scatter-gather DMA interfaces. Alternatively, a write to a starting address for a specified length in memory may be done using DMA interfaces 216 through 219. Once one descriptor is processed, another descriptor may automatically be processed, and so on, for this is peripheral-to-memory communication.

It should be appreciated that FIFOs 250 and 251 each have a bit width corresponding to the bit width of memory controller interface 212, namely 128 bits wide for example. Thus, a user may write, or read, multiple quad words onto, or from, a line of any of FIFOs 250 and 251.

Supported transfer types may include single word, cache line, fixed length burst, and indeterminate burst (e.g., end location of bursting transfer not presently known). These indeterminate bursts are supported in crossbar 299, but not in memory controller interface 212, as described below in additional detail. It should be appreciated that there is a distinction between burst and line data transfers. Line transfers have an architectural identity in that they start at the beginning of a line and go to the end of the line. Thus, for a cache line transfer, access starts from the beginning of the line and goes to the end of the line, whether or not a wraparound condition follows. In contrast burst transfers may start at the beginning of any word on a line at an identified address and continue until an end word is reached. Thus, a burst transfer may, but need not, start at the beginning of a line. Because of the architectural identity of line transfers, line transfers are not translated. However, burst transfers may be translated. Thus, for example long bursts may be translated to fixed short-length bursts by multiplexing circuitry (not shown) of crossbar 299. For line transfers, writes start at the beginning of a line, though reads are not so constrained as they may start at any word in a line.

Figure 3:
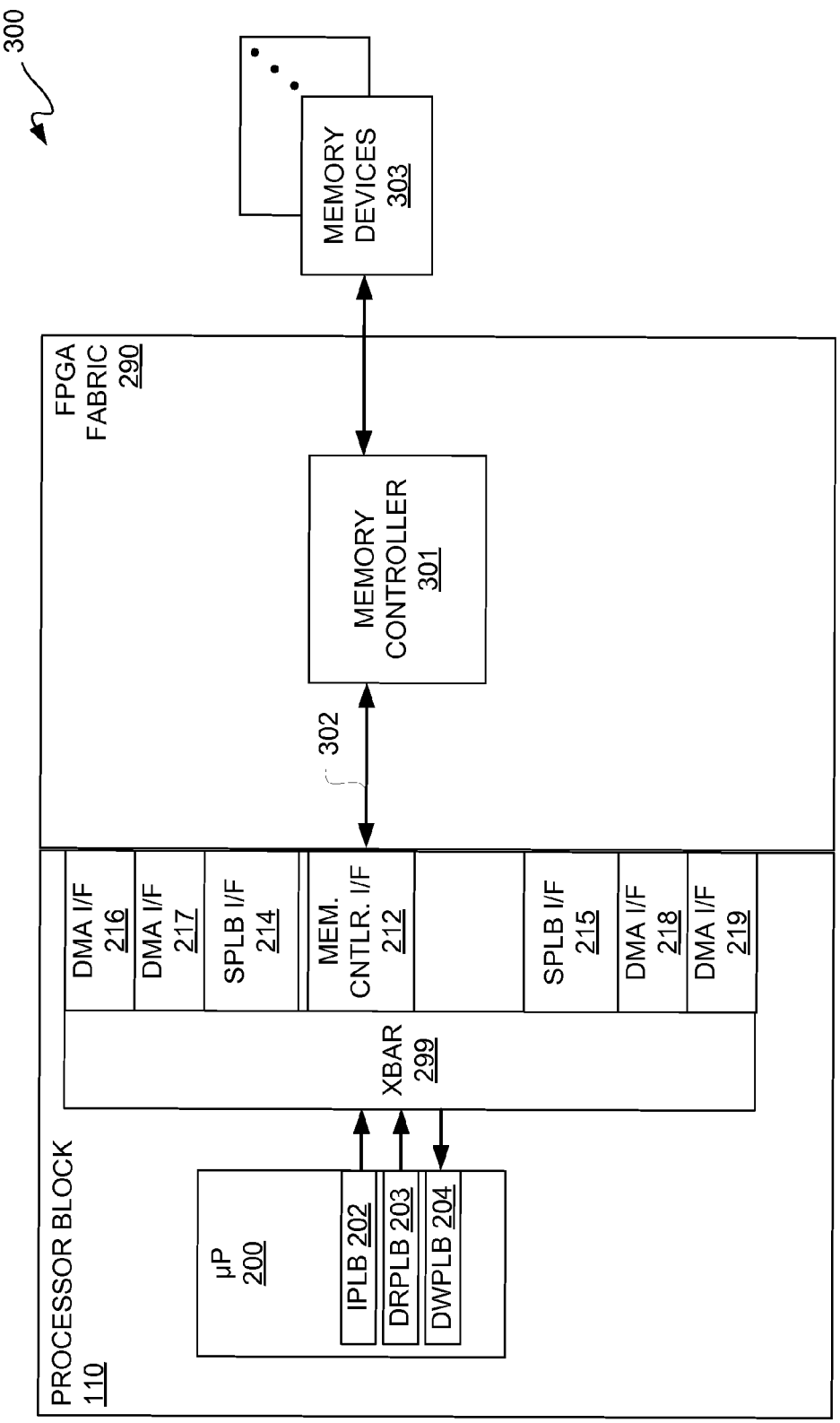
FIG. 3 is a block diagram depicting an exemplary embodiment of a system in which the processor block of FIG. 2 may be used.

FIG. 3 is a block diagram depicting an exemplary embodiment of a system 300 in which processor block 110 may be used. Processor block 110 may be coupled to a memory controller 301 instantiated in FPGA fabric 290. Accordingly, memory controller 301, or at least the portion of that circuit instantiated in programmable logic of FPGA fabric 290, may be thought of as a "soft" memory controller. Memory controller 301 may be coupled to memory controller interface 212 of processor block 110 via a soft memory control interface bus 302. Other buses (not shown) may be soft buses instantiated using PIPs of FPGA fabric 290 for coupling one or more master devices (not shown) to interfaces 214 through 219.

Memory controller 301 may be coupled to one or more memory devices 303, where such one or more memory devices 303 are either internal or external to FPGA 100.

Figure 4:
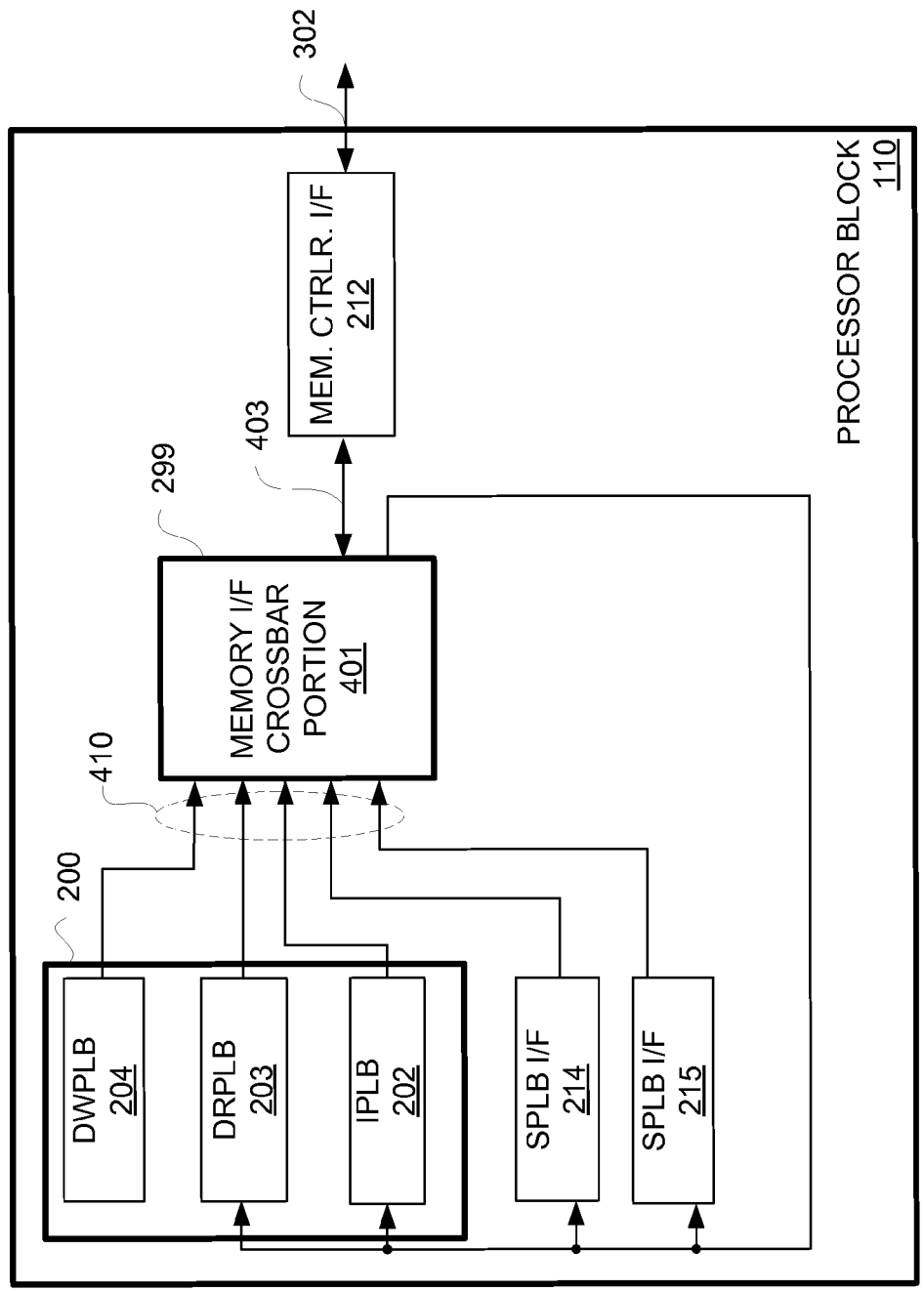
FIG. 4 is a block diagram depicting an exemplary embodiment of an interconnection for the processor block of FIG. 2.

FIG. 4 is a block diagram depicting an exemplary embodiment of an interconnection for processor block 110 of FIG. 2. The processor interconnection of FIG. 4 is described with simultaneous reference to FIG. 2.

DWPLB 204, DRPLB 203, and IPLB 202 of microprocessor 200 are each coupled to memory interface crossbar portion 401 of crossbar 299 to provide thereto write data, address, control and arbitration information from microprocessor 200. Additionally, SPLB interfaces 214 and 215 are each coupled to memory interface crossbar portion 401 to provide thereto write data, address, control and arbitration information from one or more master devices coupled to such interfaces 214 and 215.

Information input 410 provided to memory interface crossbar portion 401 of crossbar 299 is for a transaction initiated by a master device, such as microprocessor 200 or a master device coupled to an interface of SPLB interfaces 214 and 215. Such an initiated transaction may be addressed for memory controller interface 212 and provided via memory controller interface bus 403.

Figure 5:
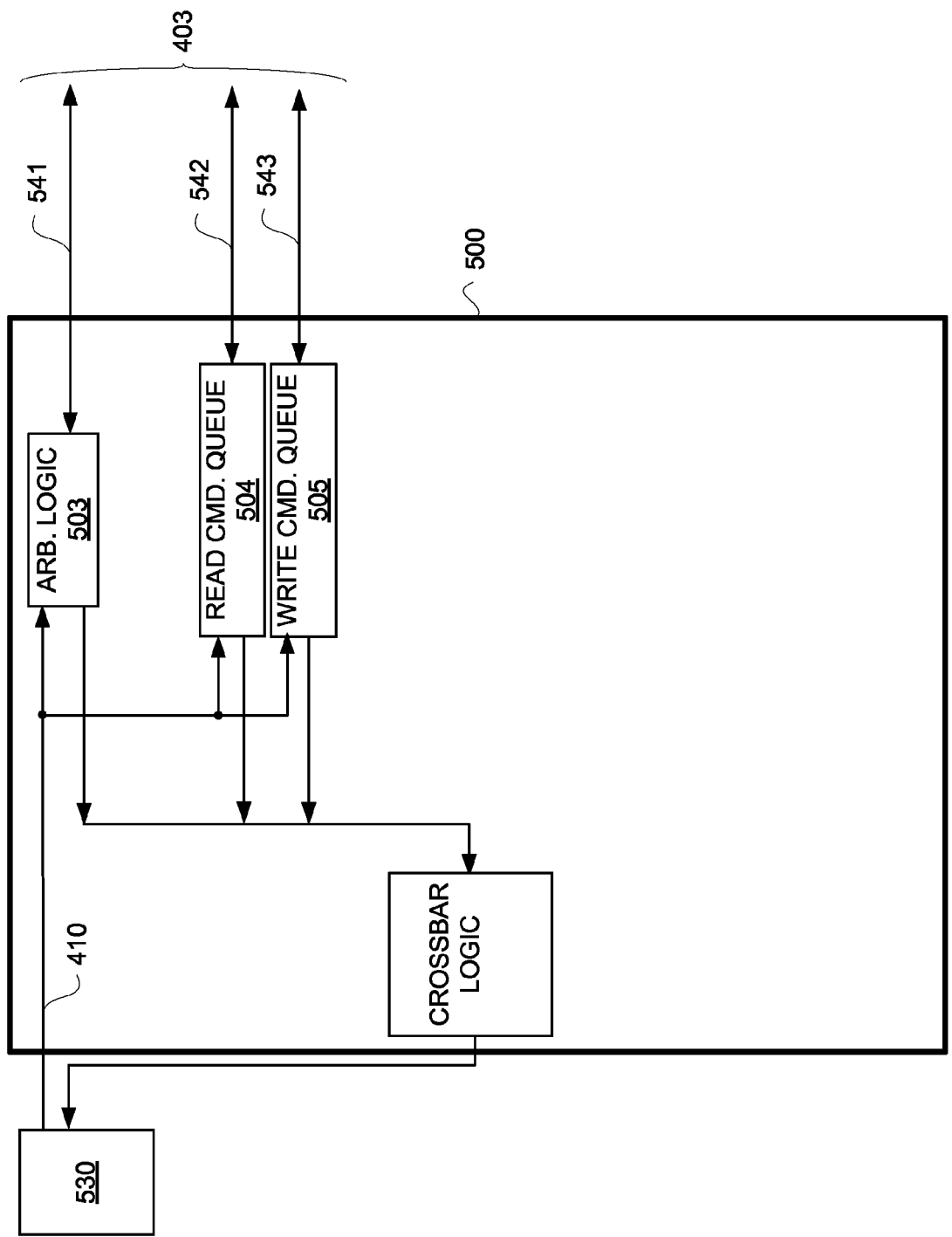
FIG. 5 is a block diagram depicting an exemplary embodiment of a crossbar structure, which may be used for the crossbar within the processor block of FIGS. 2 through 4.

FIG. 5 is a block diagram depicting an exemplary embodiment of a crossbar structure 500, which may be used for crossbar 299 of FIGS. 2 through 4. Crossbar structure 500 is further described with reference with FIGS. 2 through 5. A master device 530 provides input information 410 to a set of blocks associated with memory controller interface 212 and memory controller interface bus 403. The set associated with memory controller interface 212 includes arbitration logic 503, read command queue 504, and write command queue 505. Arbitration logic 503, read command queue 504, and write command queue 505 are respectively associated with an address phase 541, a read data phase 542, and a write data phase 543 with respect to communication with memory controller interface 212 via memory controller interface bus 403.

A PLB protocol defines two phases of a transaction, namely an address phase and a data phase, which occur independently on separate buses. When a request is acknowledged by a slave device, namely via memory controller interface 212, the slave device has committed to provide the data during the data phase of the transaction. A delay may occur before the data phase is started by the slave device. Multiple data phases may additionally be pipelined by slave devices in a system.

To keep track of data phases which are outstanding, crossbar 299 maintains two command queues for each arbiter, namely one for reads, namely read command queue 504, and the other for writes, namely write command queue 505. Crossbar 299 uses the information stored in the command queues to direct the slave device data phase responses to the appropriate master device and to determine if a transaction has been completed.

With simultaneous reference to FIGS. 2 through 5 for the remainder of this description, memory controller interface 212 is further described.

In some processor-based systems, overall system performance is highly dependent on the latency and bandwidth between a microprocessor and system or main memory. Microprocessors conventionally consume large amounts of memory, and such main memory may also be shared, namely accessed, by one or more peripherals in the system, by one or more other microprocessors, or by a combination thereof. Thus, the interconnection to the memory is sometimes a system bottleneck.

To address such bottleneck, processor block 110 includes memory controller interface 212 as an interface to FPGA fabric 290 to reduce latency and increase bandwidth for a more efficient connection of memory to microprocessor 200, as compared with directly connecting IPLB 202, DRPLB 203, and DWPLB 204 to FPGA fabric 290. Memory controller interface 212 thus facilitates improved performance with respect to accessing one or more memory devices 303, while preserving the flexibility to use various memory types by having a programmably configurable memory controller 301 instantiated in FPGA fabric 209. Therefore, the PHY layer of memory controller 301 for different types of memory devices, such as DDR DRAM, QDR DRAM, and SRAM, among other known types of memory, is implemented as soft logic while the PLB interface slave portion of memory controller 301 is hardened and implemented as part of memory controller interface 212.

By including PLB interconnection and associated memory interface slave portions in processor block 110, arbiter 221 and memory controller interface 212 may be closely integrated to enhance transaction flow for the overall PLB-to-memory controller interconnection, as well as to allow PLB transactions to be executed in processor block 110 at a higher frequency than currently possible with a PLB-to-memory controller interconnection implemented entirely in soft logic.

To facilitate additional performance improvement, crossbar 299 eliminates blocking of transactions to memory controller interface 212 while other master/slave transactions are in process. Furthermore, memory controller interface 212 may support split transactions by allowing multiple transactions to be pipelined to memory controller 301, subject to availability of memory controller 301. The side of memory controller interface 212 associated with crossbar 299 may be tightly coupled with arbiter 221 to enhance utilization of PLB buses.

Use of memory controller interface 212 reduces the previously required level of complexity of memory controller 301, and thus programmable logic of FPGA fabric 290 used to implement memory controller 301 may be operated at substantially higher frequencies then previously possible when the PHY layer of memory controller 301 was instantiated in programmable logic. Moreover, memory controller interface bus 302 of FIG. 3 may appear as a FIFO interface with respect to a user, thus hiding complications associated with a PLB interconnection.

Figure 6:
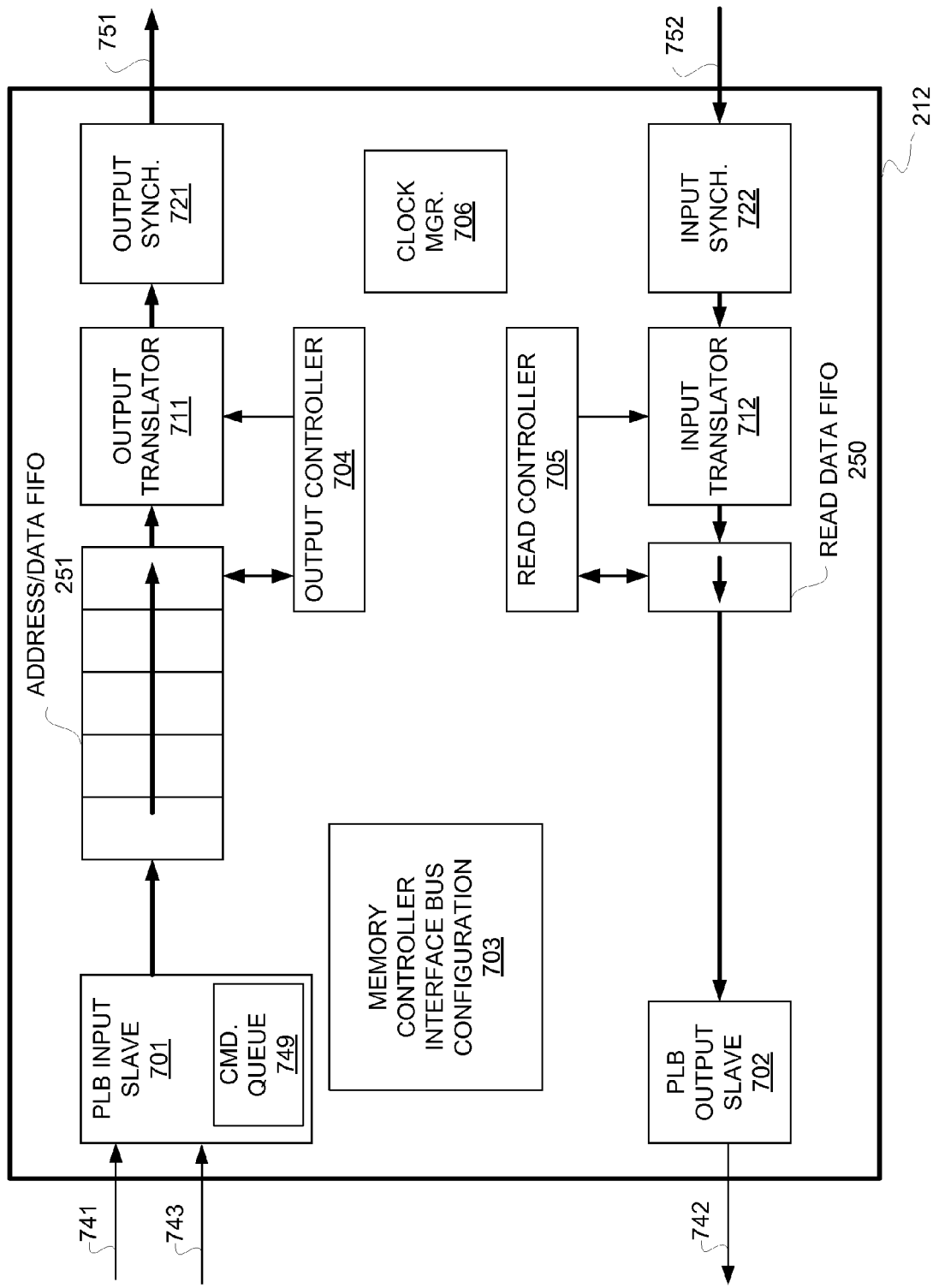
FIG. 6 is a block diagram depicting an exemplary embodiment of a memory controller interface.

FIG. 6 is a block diagram depicting an exemplary embodiment of a memory controller interface 212. Control and clock signals have not illustratively been shown in detail in FIG. 6 for purposes of clarity and not limitation.

Memory controller interface 212 includes PLB input slave block 701, PLB output slave block 702, address/data FIFO 251, output translator 711, output controller 704, input translator 712, read controller 705, read data FIFO 250, memory controller interface bus configuration block 703, clock manager block 706, output sync block 721, and input sync block 722.

Address bus 741 provides address information to PLB input slave block 701. Data bus 743 provides write data to PLB input slave block 701. It should be appreciated that buses 741 and 743 are part of memory controller interface bus 403. Thus, for example, write data to be written to one or more memory devices 303 coupled to memory controller interface 212 via memory controller 301 may be provided via data bus 743 along with address information via address bus 741 for writing such data to memory. Address information and data obtained by PLB input slave block 701 may be provided to address/data FIFO 251. In this exemplary embodiment, address/data FIFO 251 is a five-deep FIFO; however, other FIFO depths may be used.

Coupled to address/data FIFO 251 is output controller 704 and output translator 711. Output of address/data FIFO 251 is provided to output translator 711, which is also coupled to output controller 704. Output from output translator 711 is provided to output sync block 721 for providing via output bus 751. Output bus 751 may be associated with memory controller interface bus 302. Thus, PLB input slave 701, address/data FIFO 251, output controller 704, output translator 711, and output sync block 721 form a write data/address path and a read address path of memory interface controller 212

A read data path of memory controller interface 212 is coupled to an input bus 752, which may be associated with memory controller interface bus 302. Input bus 752 is coupled to provide input to input sync block 722, such as providing data read from memory coupled to memory controller interface 212. Output of input sync block 722 is provided to input translator 712. Output of input translator 712 is provided to read data FIFO 250. Read data FIFO 250 and input translator 712 are each coupled to read controller 705.

In this exemplary embodiment, read data FIFO 250 is only a one-deep FIFO. A one-deep FIFO may be used as the protocol for some memory provided, however, that the requesting device has sufficient buffer space to store the result of the transaction, namely the read. Thus, as the protocol involves having sufficient buffering by a requesting or transaction issuing device, a one-deep buffer may be used for read data FIFO 250.

Memory controller interface bus configuration block 703 may be used for configuring memory controller interface 212, such as by setting internal registers 270. As previously described, internal registers 270 may be programmed such as responsive to a configuration bitstream. Alternatively, internal registers 270 may be programmed via DCR 205. Additionally, if memory controller interface 212 is reset, default values stored in memory cells 291 tied to internal registers 270 may be used for configuring memory controller interface 212. Memory controller interface 212 further includes clock manager block 706 for providing clock signals, such as to FIFOs 250 and 251, among other circuits of memory controller interface 212. Details regarding control and clock logic are not illustratively shown for purposes of clarity and not limitation.

Output of read data FIFO 250 is provided to PLB output slave block 702. Output from PLB output slave block 702 is provided via read data bus 742. Read data bus 742 is associated with memory controller interface bus 403. Along those lines, a transaction from memory controller interface 212 to memory controller 301 may at a minimum include an address and a read/write signal to indicate if it is a read or a write. If a transaction is a write, write data may be presented on write data bus 743 as input to PLB input slave block 701. If a transaction is a read, memory controller interface 212 expects data along with a valid signal at some future point in time on input bus 752 as input from memory controller 301 after having performed a read of one or more of memory devices 303.

Although physical internal data buses of memory controller interface 212 may have fixed widths, such as 128 bits wide for example, the user has the option of downsizing the bus with respect output bus 751 and input bus 752. This feature means that memory controller 301 does not have to implement large multiplexers in FPGA fabric 290, when memory devices 303 have data interfaces smaller than the internal data buses of memory controller interface 212. For example, when a user selects a 32-bit bus and memory controller interface 212 has 256 bits of data to transmit, memory controller interface 212 may send out eight 32-bit, back-to-back words to FPGA fabric 290 on bits 0 to 31 of an output bus 751. Not only may this save area in FPGA fabric 290, it may also allow for higher speeds of operation. User configurable multiplexing may further be implemented on the read path, so that FPGA fabric 290 does not have to be configured to form words of internal bus width of memory controller interface 212, such as for example 128 bits, for input bus 752.

By having output bus 751 and input bus 752 capable of variable widths, variable burst sizes may be supported. Every time a burst size is reached, a new address may be generated to send out to FPGA fabric 290. For example, assume the starting address is 0 and there is a PLB write of 64 bytes of data (a burst of four 128-bit words), where output bus 751 is set to 128 bits wide and configured for bursts of either 2 words of 128 bits or 2 beats. A transaction on output bus 751 may be for example as follows: (address 0, write 0-15), (write 16-31), (address 32, write 32-47), (write 48-63).

Accommodating different size bursts allow different memory controllers to be attached to output bus 751 while simplifying logic of memory controller 301. For example, one memory device may only support bursts of 8, while another simpler memory device may only support bursts of one. Memory controller interface 212 takes an address directly from a PLB crossbar interface and sends it out to FPGA fabric 290, adjusting the address when applicable for bursts. Thus, memory controller interface 212 is generally not memory device specific, and does not necessarily need to have any knowledge regarding the type of memory coupled to it.

To further simplify row and bank detect logic, a changed location signal, such as two bits, may be produced by memory controller interface 212 as part of output bus 751. This changed location signal may be used to inform memory controller 301 if the bank and row for a next burst have changed from the previous burst. This changed location signal may be based on a mask that covers any of an upper address range, for example the upper 32 bits of the address range for a 36-bit address range. This changed location signal may decrease complexity of compare logic of memory controller 301.

Bank and row conflict signals may be used to allow memory controller interface 212 to know when memory controller 301 may have to stall due to a bank or row change. In some circumstances, memory controller 301 may close one page and open another page of memory, and this may prevent memory controller 301 from accepting another transaction for awhile. Accordingly, memory controller 301 may assert a hold off signal to memory controller interface 212 to stop delivery of any new addresses until de-assertion of the hold off signal. However, due to the time delay between memory controller 301 asserting a hold off signal and memory controller interface 212 reacting to such hold off signal, an extra address or two could be released by memory controller interface 212 to memory controller 301, which would cause memory controller 301 to overflow.

However, memory controller interface 212 is configured to detect bank or row changes to assert an internal not ready signal. Because memory controller interface 212 does not know how long to assert such an internal not ready signal, memory controller 212 may be configured to assert such a not ready signal for a period of time sufficient to allow assertion and propagation of memory controller 301's hold off signal to be received and processed by memory controller interface 212. Thus, even though memory controller interface 212 may internally assert a not ready signal, memory controller interface 212 still may rely on memory controller 301 to assert/de-assert a hold off signal.

There are four events which may be used to cause automatic assertion of an internal not ready signal by memory controller interface 212, namely change of a bank, change of a row, change of direction (e.g., from read to write or write to read), and a transaction involving a read modify write ("RMW") sequence of operations by memory controller 301. A control register may be used to control which of these four events, or combination of these four events, may cause an automatic assertion of an internal not ready signal by memory controller interface 212. In addition, a control register may be used to control how many cycles may be inserted after a conflict occurs.

A RMW mode of memory controller interface 212 may be used with memory controllers that have error-correcting code logic ("ECC"). Suppose, for example, a memory is laid out as four groups of 64-bit words, and suppose only one of the 64-bit groups is to be processed, where the ECC value associated with the 64-bit group to be processed is based on each of the 64 bit groups associated therewith, namely each ECC value is based on 4 by 64 bits. Because memory controller 301 may take some number of cycles to write back the modified word read with a recalculated ECC value, memory controller interface 212 in a RMW mode may automatically go into a temporary wait mode after transmitting write data for a RMW transaction. Memory controller interface 212 may be set to wait for a period of time sufficient to allow assertion and processing of memory controller 301's hold off signal to be received by memory controller interface 212.

In a RMW mode, if byte selects are not fully enabled, memory controller interface 212 may institute an auto-hold sequence, giving memory controller 301 time to assert its own address not ready signal. All the write data for a RMW transaction may be released to FPGA fabric 290 before memory controller interface 212 may look at the address not ready signal. In other words, memory controller interface 212 may finish this transaction before sending out the next transaction.

Figure 7:
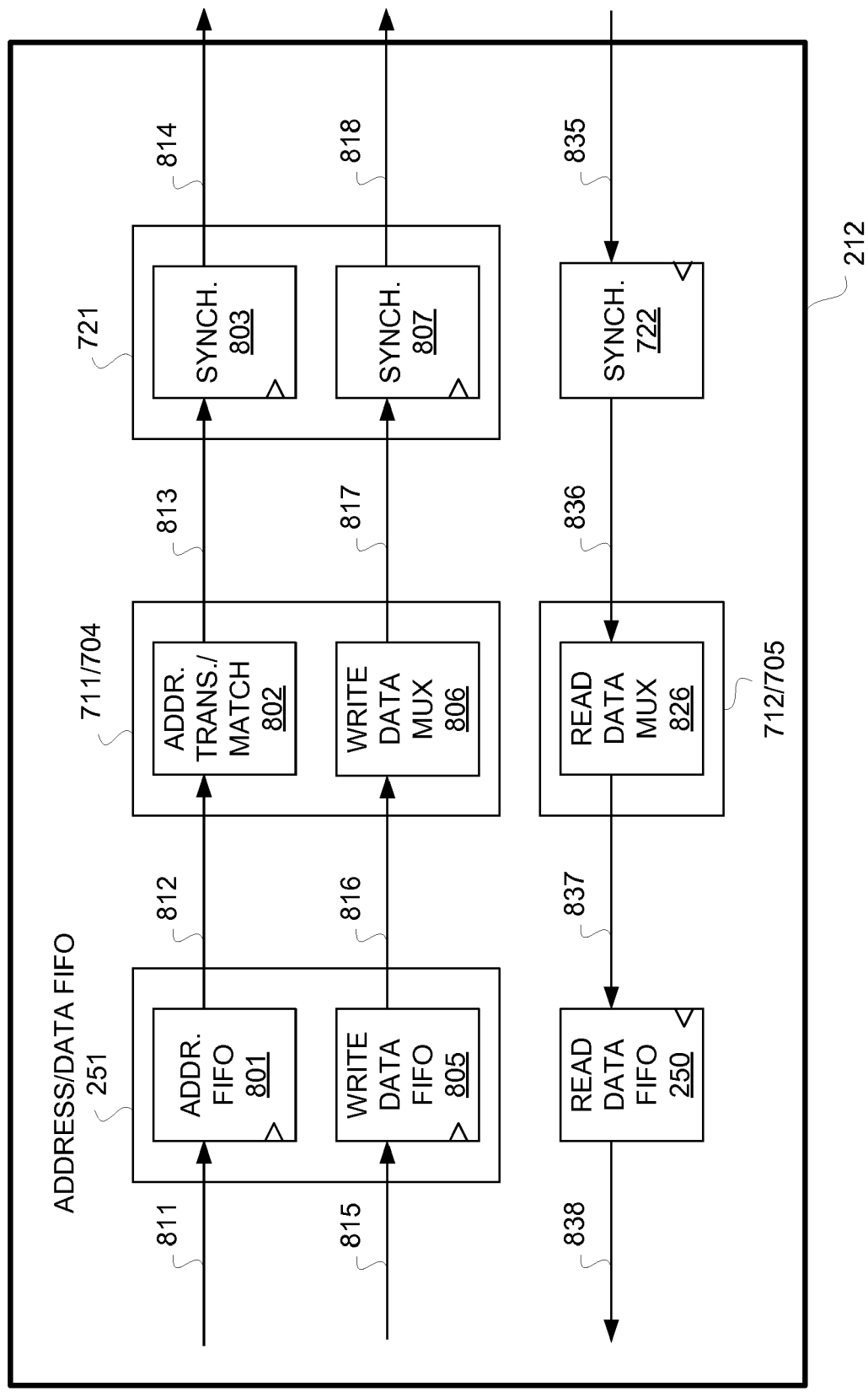
FIG. 7 is a data flow diagram depicting an exemplary embodiment of data flow of the memory controller interface of FIG. 6.

FIG. 7 is a data flow diagram depicting an exemplary embodiment of data flow of memory controller interface 212, which is described with additional reference to FIG. 6. With respect to a write data path of memory controller interface 212, a PLB to memory interface address signal 811 is provided to an address FIFO 801. Address FIFO 801 may be part of address/data FIFO 251. Separately provided is a PLB to memory interface write data signal 815, which is provided to write data FIFO 805, which also may be part of address/data FIFO 251. In other words, address/data FIFO 251 is two separate FIFOs, namely an address FIFO and a write data FIFO.

FIFO address output signal 812 from address FIFO 801 is provided to address translator/match block 802. FIFO write data output signal 816 from write data FIFO 805 is provided to write data multiplexer 806. Blocks 802 and 806 may be part of output translator 711/output controller 704. Memory interface address signal 813 provided from address translator/match block 802 is provided to synchronizer 803. Memory interface write data signal 817 is provided from write data multiplexer 806 to synchronizer 807. Synchronizers 803 and 807 are part of output sync block 721. Output from synchronizer 803 is memory controller address signal 814, and output from synchronizer 807 is memory controller write data signal 818.

With respect to a read data path, memory controller to memory interface read data signal 835 may be received by input sync block 722 of memory controller interface 212.

Output of input sync block 722 is read data signal 836, which is provided as an input to read data multiplexer 826. Read data multiplexer 826 may be part of input translator 712/read controller 705. Output of read data multiplexer 826 is multiplex read data signal 837, which is provided as an input to read data FIFO 250. Output of read data FIFO 250 is memory interface to PLB read data signal 838.

Returning to FIG. 6 with additional reference to FIG. 7, output translator 711 may be configured to translate from one bit width to another bit width. For purposes of clarity by way of example and not limitation, for data of write data FIFO 805 output in 128-bit increments, namely a 128-bit wide bus, output translator 711 may provide 128-bit wide output or may be configured to translate such 128-bit wide output to a lesser bit width, such as 32- or 64-bit wide outputs depending on configuration of output bus 751 as it is instantiated in FPGA fabric 290. Memory controller interface bus configuration block 703 may be configured for a particular bit width associated with a user defined bit width of output bus 751 such that output translator 711 provides the correct bit width. Additionally, output translator 711 may be configured for bursting. Thus, even though the output bit width of output bus 751 may be 128 bits, communication may be in the form of, for example, four beats of 128 bits each. Output translator 711 is configured to burst data accordingly. Though the examples of 128-bit width and four beats are illustratively used, it should be appreciated that other bit widths and other burst increments may be used.

A user may set bus width for output bus 751 to a constant value, such as 32, 64, or 128 bits, as previously described, or some other known value. Transactions to FPGA fabric 790 via memory controller interface 212 thus may be of a constant length as defined by a user to further simplify design of soft memory controller 301 of FIG. 3.

It should be appreciated that if a burst of four beats of 128 bits each did not have a sufficient amount of data, to fill all four beats, output translator 711 is configured to pad such bursts to provide the correct amount of bits, namely the total number of bits output would still be four beats of 128 each. Output synchronizer 721 synchronizes the clock rate of memory interface 212 with that output bus 751. Likewise, input synchronizer 722 synchronizes the clock rate of memory controller interface 212 with input bus 752. Input translator 712 forms 128-bit quad words for providing lines of data at time to read data FIFO 250. Thus, for example, if input bus 752 was a 32-bit wide input bus, input translator 712 would accumulate four words of 32 bits each for writing 128 bits of data at a time to read data FIFO 250. Again, other bit widths may be used.

Depending on depth of address FIFO 801 and read data FIFO 250, it should be appreciated that latency with respect to write and read data paths of memory controller interface 212 involves a one clock cycle latency with respect to synchronizers, such as synchronizers 803, 807 of output synch block 721, as well as input synch block 722, as well as at least a one clock cycle latency for FIFOs, such as address FIFO 801 and write data FIFO 805, as well as read data FIFO 250. More particularly, for a write data path through memory controller interface 212 for the above example of a five-deep FIFO for address/data FIFO 251, namely where address FIFO 801 is five deep and write data FIFO 805 is five deep, there is a five clock cycle latency to get through such FIFOs plus an additional one clock cycle latency for synchronizers 803 and 807, respectively. If the FIFO is 5 deep, but happens to be empty, there may only be a one cycle of latency. The depth of the FIFO does not cause the latency to increase if it is empty. On the read path, there is only a two cycle latency for the above example of read data FIFO being one deep, namely a one cycle latency for synchronizer 722 and a one cycle latency for read data FIFO 250.

Memory controller interface 212 receives PLB transactions from an arbiter of crossbar 299. The instructions or transactions received may be from a number of different devices via crossbar 299, such as microprocessor 200 or one or more master devices coupled to either or both of SPLB interfaces 214 and 215. Again, one or more master devices instantiated in FPGA fabric 290 may be coupled to SPLB interfaces 214 and 215. SPLB interfaces 214 and 215 may simplify transactions originating from master devices instantiated in FPGA fabric 290, such as indeterminate bursts.

To enhance throughput, an arbiter of crossbar 299 may acknowledge addresses for memory controller interface 212. Thus, the master device sends a request signal to the arbiter of crossbar 299, and as long as such request signal is valid, the arbiter of crossbar 299, namely arbiter 221, will be able to identify the PLB master device requesting access to memory controller interface 212. By having arbiter 221 produce address acknowledgements for master devices requesting access to memory controller interface 212, address acknowledgement latency may be decreased as compared with having such acknowledgements generated by memory controller interface 212.

Memory controller interface 212 does not directly accept indeterminate bursts. Instead, memory controller interface 212 relies on SPLB interfaces 214 and 215 to break up transactions into known, fixed-size bursts, namely transactions of 128 bits. Because microprocessor 200 is already configured for 128-bit bursts, such bridging need not be done as between microprocessor 200 and memory controller interface 212. In other words, because microprocessor 200 does not create this type of transaction, this functionality may be pushed out further toward the perimeter of processor block 110, namely to SPLB interfaces 214 and 215. By breaking up transactions into known, fixed-size bursts, it should be appreciated that higher bus utilization rates inside crossbar 299, as well as memory controller interface 212 for example, may be obtained.

As previously described, arbiter 221 provides an early address acknowledgement for memory controller interface 212. This allows an address acknowledgement to occur earlier in time than if such address acknowledgement were provided from memory controller interface 212. Accordingly, this allows for reduced latency and increased throughput. Arbiter 221 may be configured to provide early address acknowledgement for memory controller interface 212 responsive to an accept address signal provided from memory controller interface 212 to arbiter 221.

Again, in order to reduce latency and increase throughput, arbiter 221 accepts data writes on behalf of memory controller interface 212. For arbiter 221 to know whether memory controller interface 212 is capable of accepting another beat of data, an accept data signal is provided from memory controller interface 212 to arbiter 221

However, it should be understood that arbiter 221 creates both a write data acknowledge signal to a requesting master device as well as a write data complete signal and a write data terminated signal. The write data complete signal may be created by an SPLB to indicate that the last set of data to finish a transaction is being sent. The write data terminate signal indicates that the write transaction has terminated, having gone to completion.

Due to simplifications for busing, namely memory controller interface bus 302, memory controller interface 212 is not configured for all implications of a PLB protocol for signal going from memory controller interface 212 to arbiter 221. For instance, memory controller interface 212 does not early terminate a write transaction, and thus there is no need for memory controller interface 212 to produce a burst terminate signal. Another simplifying omission is that no master device may early terminate a write transaction, and thus memory controller interface 212 is not configured for early termination of a write transaction.

With respect to read requests, however, arbiter 221 produces a read data acknowledgement signal for read requests as well as write requests. Memory controller interface 212 produces other signals for read requests, namely a read data complete signal and a read data terminated signal. Because data is flowing in the reverse direction with respect to read data complete and read data terminated signals, there may be no advantage for arbiter 221 to generate such read control signals. Furthermore, generally there will be advantage for arbiter 221 to generate a read data acknowledgement signal for providing to a master device as a proxy for memory controller interface 212 for reduced latency or increased throughput.

The read data terminated signal may be tied together with the read data complete. According to a PLB specification from IBM, the read terminate signal is used by a slave device to terminate a burst. Because memory controller interface 212 is not configured for early termination of any burst, these two signals may be tied together.

A read complete signal may be issued in the same cycle as the last read data acknowledgement signal. According to the PLB specification from IBM, the read complete signal may be issued in the cycle before the last read data acknowledgement signal in order to let an arbiter start the next cycle of arbitration to prevent idle cycles between transactions. However, crossbar 299 is configured such that there is no reason for arbiter 221 to need this much information; thus, for example, if there is only one slave device coupled to memory controller interface 212, data may be returned in a minimum of four clock cycles.

When memory controller interface 212 is reset, control registers reset predetermined program states; in other words, memory cells 291 may be used to drive static signals in processor block 110. Via DCR 205, these static signals may be overridden. These predetermined signals may be distributed within memory controller interface 212, where output controller 704 includes control logic to allow address and write data to flow through memory controller interface 212. Read controller 705 aggregates and sends read data back to a PLB arbiter, namely arbiter 221.

Translation modules, namely output translator 711 and input translator 712, respectively handle packaging and unpackaging of data to match interface size. Address/data FIFO 251 and read data FIFO 250 are used to buffer transactions and write and read directions, respectively, between a requesting master device via a PLB, and memory controller 301.

PLB input slave block 701 handles PLB signals generated for communication with memory controller interface 212 and puts incoming data into a form that may be stuffed into address/data FIFO 251. PLB output slave block 702 takes care of read data acknowledgement signaling back to arbiter 221, as well as other signals that are generated for communication with arbiter 221.

When a read request from arbiter 221 arrives, the request is passed into address/data FIFO 251 and placed in a command queue 749 in PLB input slave block 701. During the entire transaction, a busy bit may be asserted for that particular master device requesting execution of the transaction. Thus, command queue 749 may be used to keep track of outstanding transactions. When data is returned from a read transaction, if there is an error on the data bus, memory controller interface 212 returns the error to the requesting master device using information stored in such command queue 749. Write transactions cause a busy bit to stay high until such writes leave output bus 751.

As a read transaction is accepted into address/data FIFO 251, it will be presented to a read command queue of command queue 749 as well as address/data FIFO 251. Write transactions are placed in a separate write output command queue of command queue 749, and addresses for writes are placed in address/data FIFO 251. The read command queue retains information such as read data size, master device identifier, and validity status for each read command therein. The write output command queue retains information such as master device identifier and validity status for each write command therein.

If master device identifier and validity status bits are maintained in the same relative bit positions in the read or write output queues, decode logic may be hardwired into such queues such that they produce busy bits back to arbiter 221. When data is returned from read data FIFO 250 to arbiter 221, the first entry pushed on may be popped off and used to send the data back. Memory controller interface 212 may retain information to know how much data is to be returned for such transaction.

Memory controller interface 212 does translation from the arbiter side thereof into the core of memory controller interface 212. A detection circuit of PLB input slave block 701 may be used to determine the real length of incoming transactions, whether or not such a transaction is a burst, and whether a particular transaction is using the "BE" signal for byte enables or for data length.

When data is returned from memory controller 301, there may be extra data due to burst boundaries. Memory controller interface 212 keeps track of how many bits for real data and padding, respectively, are to be sent out. To figure out what beat of data is to be dropped and what data is to be sent, an address may be shifted around and manipulated to figure out where memory controller 301 may start returning data and where memory controller 301 may stop sending data. This information may then be compared to what crossbar 299 requested, and memory controller interface 212 may release the data to crossbar 299 with a read acknowledgement signal for the real data with merely dumping the padding data to ground. Due to timing parameters, the number of beats to be sent, including those with padding bits, may be calculated and put into a FIFO, such as read data FIFO 250.

Memory controller interface 212 creates signals for crossbar 299 for line reads. For a line read, a read word address signal may be updated every time a new beat is sent to crossbar 299. A read complete signal may be generated on a last beat of a read transaction. If a burst is terminated early and only one more beat of data is allowed to be sent, the rest of the data for the transaction that was to be sent may be spilled to ground.

Memory controller interface 212 is configured to check: if a next transaction is of the same type (read or write) as a current transaction (read or write); if an address in the address FIFO is invalid; if an address of a current read or write transaction overlaps with the address of a next transaction; and if a current transaction is going to assert an address valid on a current cycle due to breaking up a larger transaction into smaller transactions.

In order to understand how an address may overlap with a next transaction, an example is used for purposes of clarity and not limitation. When an Ethernet media access controller ("EMAC"), for example, writes a large quantity of data into memory controller interface 212 through a DMA interface 216 through 219, such EMAC may determine it is done when finished writing all such data. However, such data may still be sitting in a FIFO of a DMA interface being used. The EMAC, considering itself to have completed writing the data, may inform microprocessor 200 that it has completed writing the data. Microprocessor 200, responsive to such information from the EMAC, may attempt to read some or all of that data back. However, due to the latency involved in such a write transaction, memory controller interface 212 may still be finishing up the write transaction with memory controller 301. In a QDR mode, it is possible that microprocessor 200 may attempt to read data before such data has been written to memory. Thus, memory controller interface 212 is configured to perform an address check to make sure that a read to an address location that is being written to is stopped until informed by memory controller 301 of the completion of the write to one or more of memory devices 303 to ensure no data corruption.

Each transaction provided to memory controller interface 212 may be assumed to be the maximum size, for example 16 by 128 bits. For every transaction that comes through memory controller interface 212, a starting address, an ending address, and an early address may be calculated. An incoming address may be compared to all three of these calculated addresses from the previous transaction. If any match occurs, there may be an overlap, and thus the transaction may not leave memory controller interface 212 until the overlapping transaction has finished.

After an address is transformed to an associated burst address, a copy of that address may be stored in address translation/match block 802 until a next burst. At the beginning of each burst, a comparator may check to determine if either or both the bank address or row address has changed since the last address went out. As bursts may start in a manner such that they do not cross a bank or a column, address match comparison may be done at the beginning of a burst to FPGA fabric 290. Two control registers may be used for this comparison, namely one control register for a row detection mask and another control register for a bank detection mask.

Output controller 704 provides control logic for the output path of memory controller interface 212. No data travels into output controller 704, rather only control and valid signals enter and exit such block.

If a transaction does not start on a memory controller interface 212 transaction boundary, output controller 704 is configured to address this issue. For example, if a transaction starts on a burst boundary, then the number of bursts is equal to the PLB bit width divided by the size of each burst of outbound bus 751, with rounding up. However, if the transaction starts in the middle of a burst, output controller 704 is configured to add an extra burst.

To further understand the addition of an extra burst, an example is provided for purposes of clarity and not limitation. Assume that memory controller interface 212 receives a transaction that is two beats at 128 bits each and that the PLB provides a PLB burst operation starting at address 0x0010 for 128 bits by two beats, there may be two bursts on output bus 751. The algorithm is as follows: if the actual starting address plus the remainder is equal to the address in a next memory controller interface 212 transaction field, then the burst size is incremented by 1. The remainder is the total size of the transaction modulus the size of the memory controller interface 212 transaction. Along those lines, a couple of corollaries may be useful. First, if an input PLB transaction starts on a natural memory controller interface boundary, the number of memory controller interface bursts need not be incremented. Secondly, if a PLB transaction does not start on a memory controller interface boundary and the remainder is 0, then 1 is added to the number of memory controller interface transactions, such as one additional burst for example.

For purposes of clarity by way of example, it will be assumed that 128-bit line addressing is used and that the address from crossbar 299 is bits [0:35] but only bits [0:31] are used. The remainder may be defined as the left over of the PLB transaction size divided by the size of the memory controller interface transaction size. Considering the memory controller interface transaction size changes, a shift and mask technique may be used instead of division. The remainder may be set equal to the burst size and the mask size remainder. This mask allows bits to come through depending on the size of the memory controller interface transfer. The mask size remainder is equal to the memory controller interface transfer size.

For example, the memory controller interface transfer size may be two 128-bit line beats, four 128-bit line beats, eight 128-bit line beats, and so forth. Burst size may range for example from 0 to 16. Continuing the above example, as at most 7 is added to any starting address, the lower 3 bits of a line address may be taken to push a 0 as the MSB 4th bit and add the remainder to get an ending address. To determine if an ending address follows onto a next burst length, logic may end the ending address with a 4-bit version of a negated mask size remainder.

By masking an ending address with the inverse of the mask size remainder, a quantity which may be termed an end address mask bottom may be provided. If either of these resultants equal 0, an extra transaction is not created except if the remainder was 0. The above algorithm is merely one example and other implementations may be used.

Write data multiplexer 806 takes write data output of write data FIFO 805 of FIFO 251 and presents it to synchronizer 807 as if such data were going to FPGA fabric 290. Write data multiplexer 806 provides byte steering according to a burst width attribute. Write data FIFO 805 stores write data before it gets sent to FPGA fabric 290. Additionally, write data may be delayed from being sent at the same time as an associated address. While it would be possible to have another FIFO for delaying the actual data, control signals may be used to control write data FIFO 805. Control bits for this FIFO delay may be popped off and used for controlling output from write data FIFO 805.

Read data FIFO 250 stores data returned from a transaction from memory controller that has yet to be sent to crossbar 299. A read data transaction/multiplexer block 826 demultiplexes data from the size obtained from FPGA fabric 290 memory interface to 128 bits wide for read data FIFO 250.

FIGS. 8 through 21 are timing diagrams depicting respective exemplary embodiments of timing for various transactions, as described above in association with memory controller interface 212 of FIG. 6. FIGS. 8 through 21 are described with simultaneous reference to FIGS. 2 through 7.

The following conventions for bus values are used where A indicates an address, WR indicates write data, and RD indicates read data. The first digit after the alpha notation of a bus value represents a cycle transaction from a PLB. After the first digit may appear a period. The last digit or set of digits represents chunks of data, for example if a PLB is transmitting two 128-bit quantities this may be indicated as WRx.0 and WRx.1 for write data.

Figure 8:
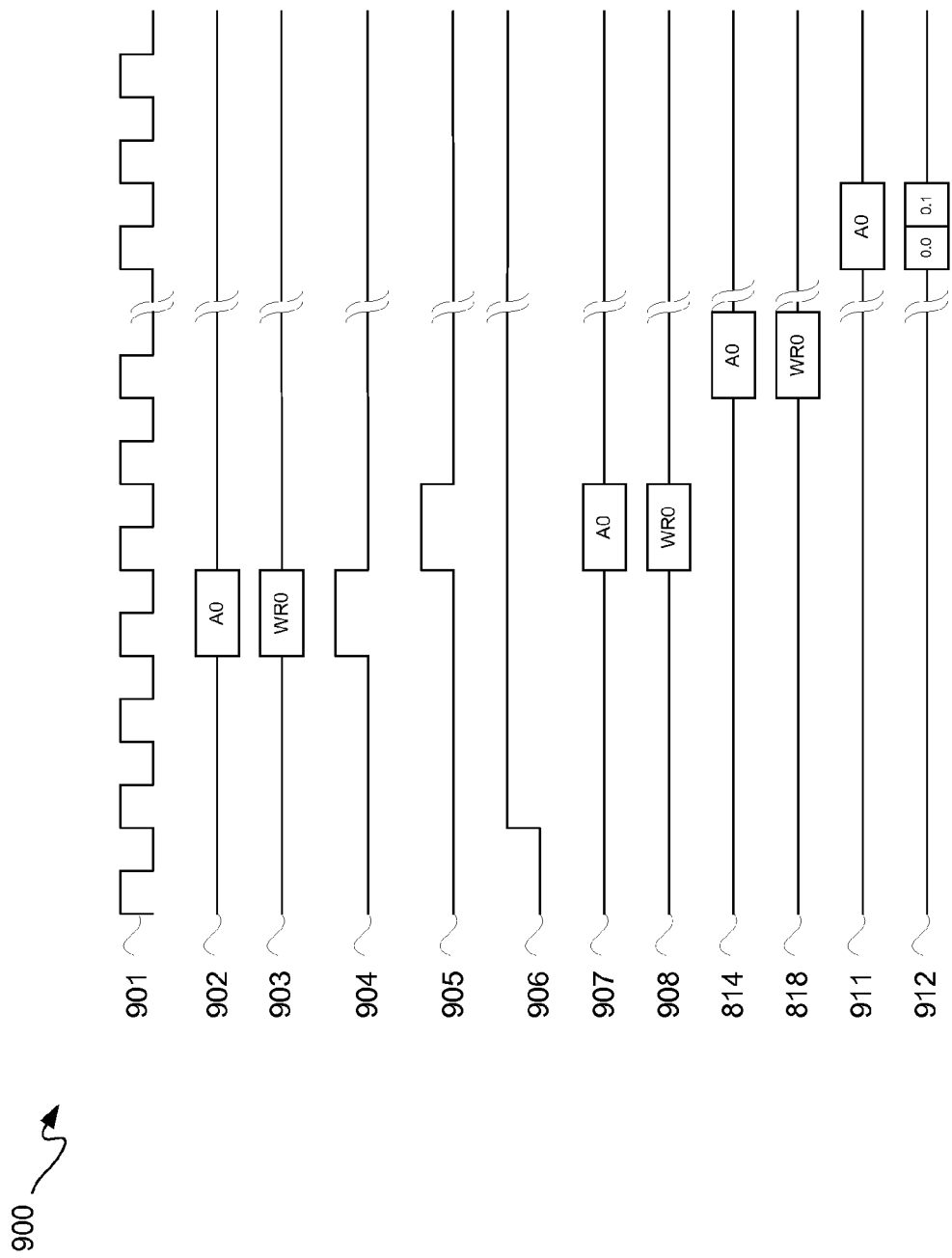
FIGS. 8 through 21 are timing diagrams depicting respective exemplary embodiments of timing for various transactions associated with the memory controller interface of FIG. 6.

FIG. 8 is a timing diagram depicting an exemplary embodiment of system level timing for a write transaction 900. A clock signal 901 indicates a hard interconnection between a clock of processor block 110 and of FPGA fabric 290. From microprocessor 200 to a PLB input slave block 701 is provided an address A0 via signal 902, and provided from microprocessor 200 to PLB input slave block 701 is provided write data WR0 via signal 903. Signals 902 and 903 are passed along to address/data FIFO 251, respectively, as signals 811 and 815 for address FIFO 801 and write data FIFO 805. Address A0 and write data WR0 are provided in the same cycle along with a request from microprocessor 200 to PLB input slave 701 via signal 904.

Arbiter 221 provides an address acknowledgment to microprocessor 200 and acknowledgment of the request provided via signal 905. The address acknowledgment provided via signal 905 is provided on the next cycle after the cycle in which the request is provided via signal 904. This acknowledgment may be provided as previously memory controller interface 211 has asserted a ready to accept signal 906 to arbiter 211.

On the same cycle of the address acknowledgment provided via signal 905, arbiter 221 via crossbar 299 provides address A0 and write data WR0 via signals 907 and 908, respectively. Signals 907 and 908 are passed to PLB input slave block 701. On the second cycle after acknowledging receipt of address A0 and write data WR0, memory controller interface 212 passes address A0 and write data WR0 to memory controller 301 via signals 814 and 818, respectively. Sometime later, address A0 is passed from FPGA fabric 290 to memory via signal 911 along with write data 0.0 and write data 0.1 via signal 912.

Once a transaction leaves memory controller interface 212, the number of cycles before the transaction is completed by memory controller 301 is dependent on the type of memory used. Accordingly, squiggly lines are used to represent a break in the number of cycles. As illustratively shown in FIG. 8, there is effectively no cycle delay from the time a PLB request is received by arbiter 221 and crossbar 299 and the time such address is received by memory controller interface 212. For this example, the memory is assumed to be a double data rate ("DDR") memory.

Figure 9:
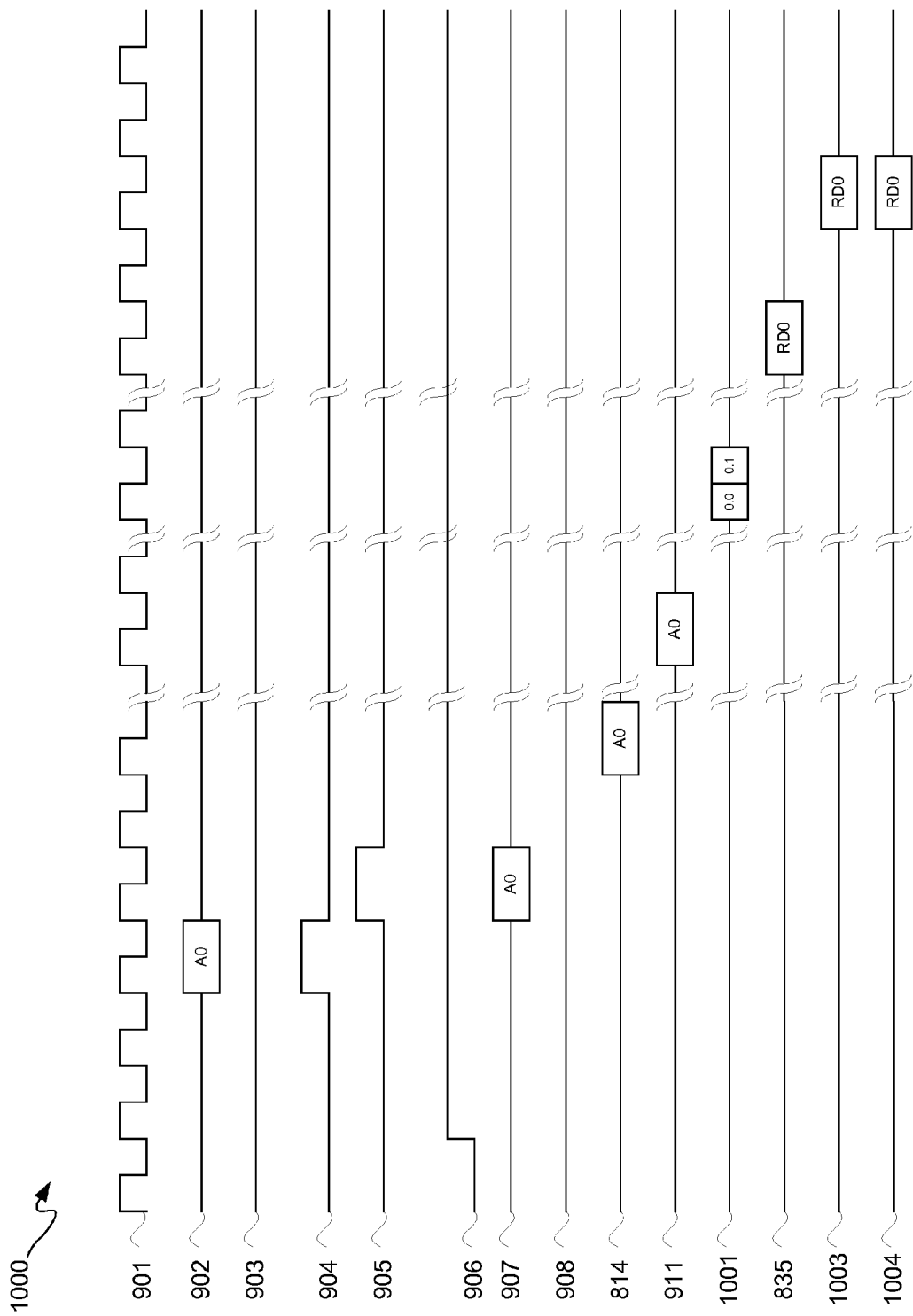

FIG. 9 is a timing diagram depicting an exemplary embodiment of system level timing for a read operation 1000. Many of the same signals for a read operation 1000 were previously used for write operation 900, and accordingly repeated description is avoided for purposes of clarity.

For a read operation, there is some latency between that time at which address A0 is provided to memory via signal 911 and the time at which memory provides data, namely data 0.0 and 0.1, back to memory controller 301 instantiated in FPGA fabric 290 via signal 1001. There may be some latency associated with operation of memory controller 301, but memory controller 301 may provide read data RD0 to memory controller interface 212 via signal 835. The read data provided via signal 835 is passed along to arbiter 221 via signal 1003 on a second cycle after receiving read data RD0 to memory controller interface 212. Read data RD0, in the same cycle that it is passed to arbiter 211, is passed to microprocessor 200 via a PLB interface as indicated by signal 1004. Thus, the examples of FIGS. 8 and 9 of write and read transactions may be initiated by microprocessor 200, such as via write and read PLBs 204 and 203, respectively.

Figure 10:
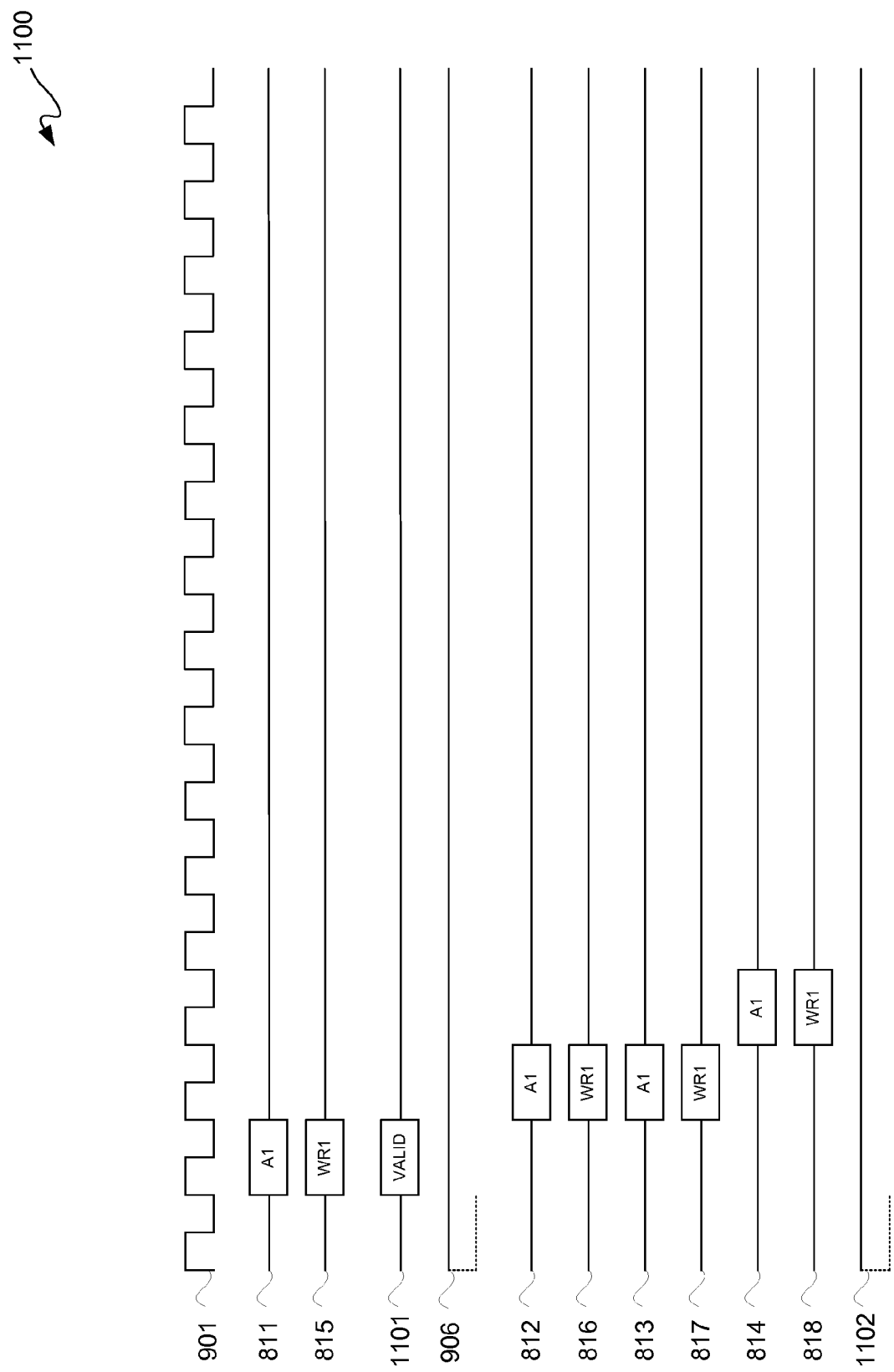

FIG. 10 is a timing diagram depicting an exemplary embodiment of write transaction 1100 from the internal PLB side of memory controller interface 212. An address A1 is passed via signal 811 to address FIFO 801 along with write data WR1 provided via signal 815 to write data FIFO 805. Qualifier size signal 1101 may indicate that the size of the data passed, namely the bit width of the data passed, and whether such bit width is a valid width. During this time it is assumed that memory controller interface 212 has asserted that it is ready to accept as indicated by signal 906 being in a logic high state.

Address A1 and write data WR1 are presented to the respective FIFOs 801 and 805 on a second clock cycle. On the next clock cycle, address A1 and write data WR1 are respectively provided from FIFOs 801 and 805 to address translation/match block 802 and write data multiplexer 806, respectively, as indicated by signals 812 and 816. On that same clock signal, address A1 and write data WR1 are respectively provided to synchronizers 803 and 807 respectively via signals 813 and 817. On a fourth rising edge, output flip-flops obtain address A1 and write data WR1 for providing to memory controller 301 via signals 814 and 818, respectively. It is assumed that memory controller 301 has asserted to memory controller interface 212 a ready-to-accept state as indicated by ready to accept signal 1102 being logic high.

Figure 11:
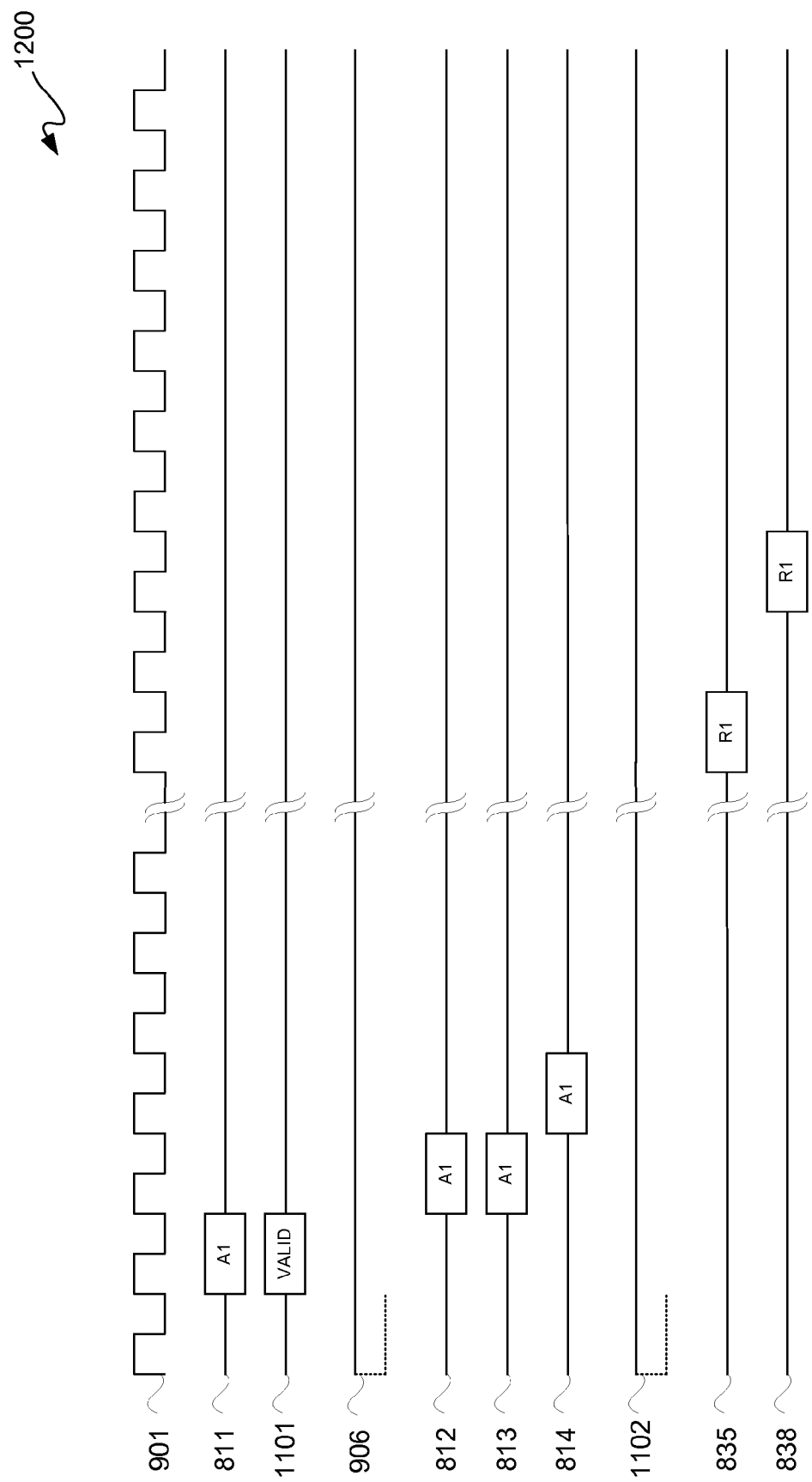

FIG. 11 is a timing diagram depicting an exemplary embodiment of a read operation 1200 from the internal PLB side of memory controller interface 212. Many of the same signals described with reference to FIG. 10 are the same with respect to FIG. 11, and thus description of such signals is not repeated for purposes of clarity.

After a received address is passed from memory controller interface 212 to memory controller 301 as indicated by address A1 by signal 814, there is some amount of time until the data is received by memory controller interface 212 as indicated by read data R1. Read data R1 is provided via signal 835 from memory controller 301 to memory controller interface 212, and more particularly to synchronizer 722 thereof. This read data is passed as read data 836 to read data multiplexer 826, and the multiplexed read data 837 is provided to read data FIFO 250. Output of read data FIFO 250 is read data R1 which is provided from memory controller interface 212 to a PLB interface of a requesting master device as generally indicated by signal 838. Two cycles after read data is received by memory controller interface 212, such read data is provided to arbiter 221 as generally indicated by signal 838.

Figure 12:
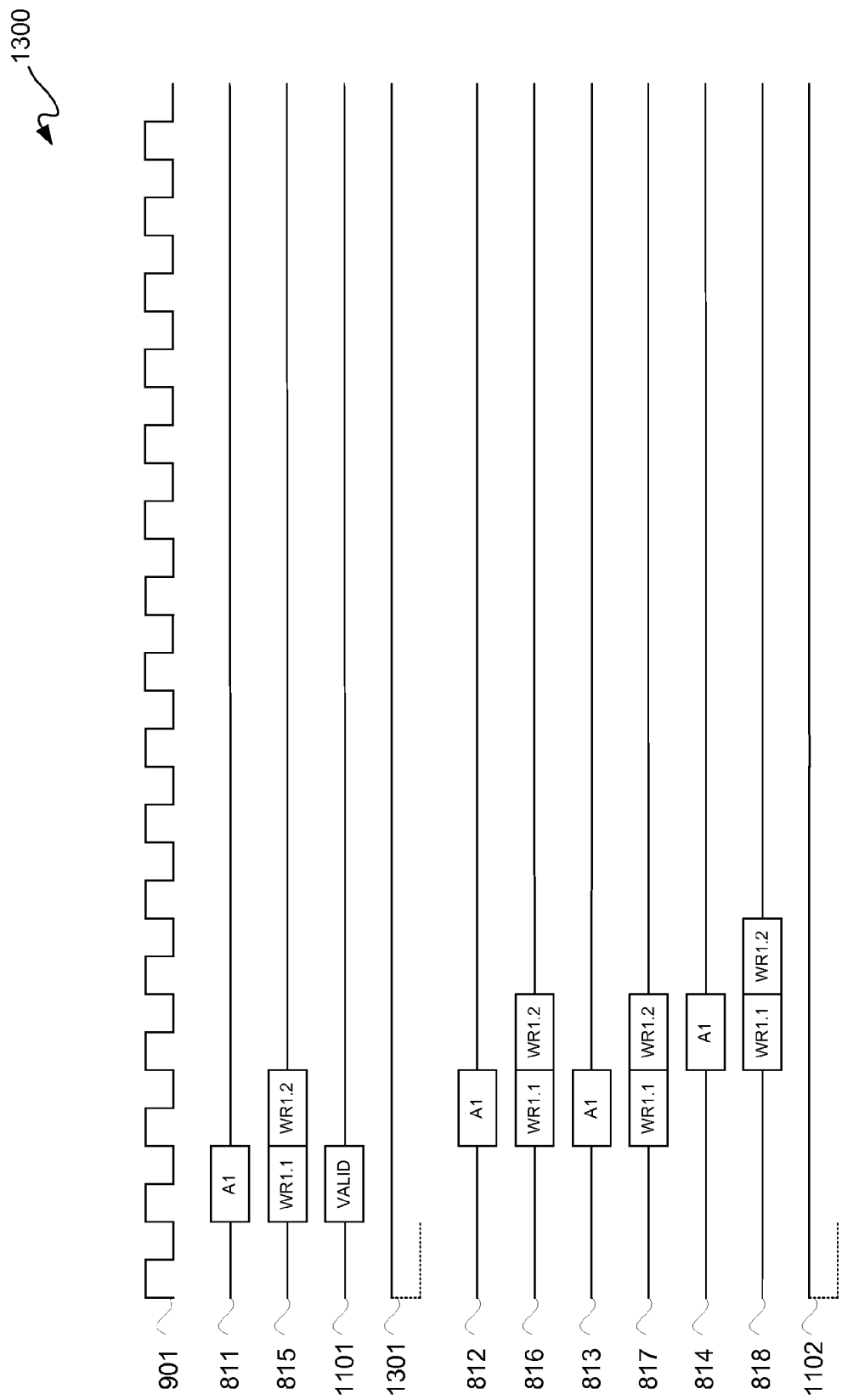

FIG. 12 is a timing diagram depicting an exemplary embodiment of a burst transfer 1300. Continuing the above example, it is assumed that memory controller interface 212 is configured for 128-bit operation with bursts of two using a PLB cache line.

In this example, it should be noted that address A1 and write data WR1.1 and WR1.2 are provided to memory controller 301 just as they arrived from arbiter 221 to memory controller interface 212, though cycles later. Address A1 is received by address FIFO 801 as indicated by signal 811 on a same clock cycle as write data WR1.1 is received by write data FIFO 805 as indicated by signal 815. On a next cycle, write data WR1.2 as indicated by signal 815 is received. For operations, memory controller interface provides an address space available signal 1301 to a PLB interface to indicate that memory controller interface 212 has available FIFO buffer space.

Transfer of write data is the same as described with reference to FIG. 10, except that the additional burst of write data WR1.2 follows on a subsequent cycle to the burst of write data WR1.1. Accordingly, there is one extra cycle for the burst of the additional write data WR1.2.

Figure 13:
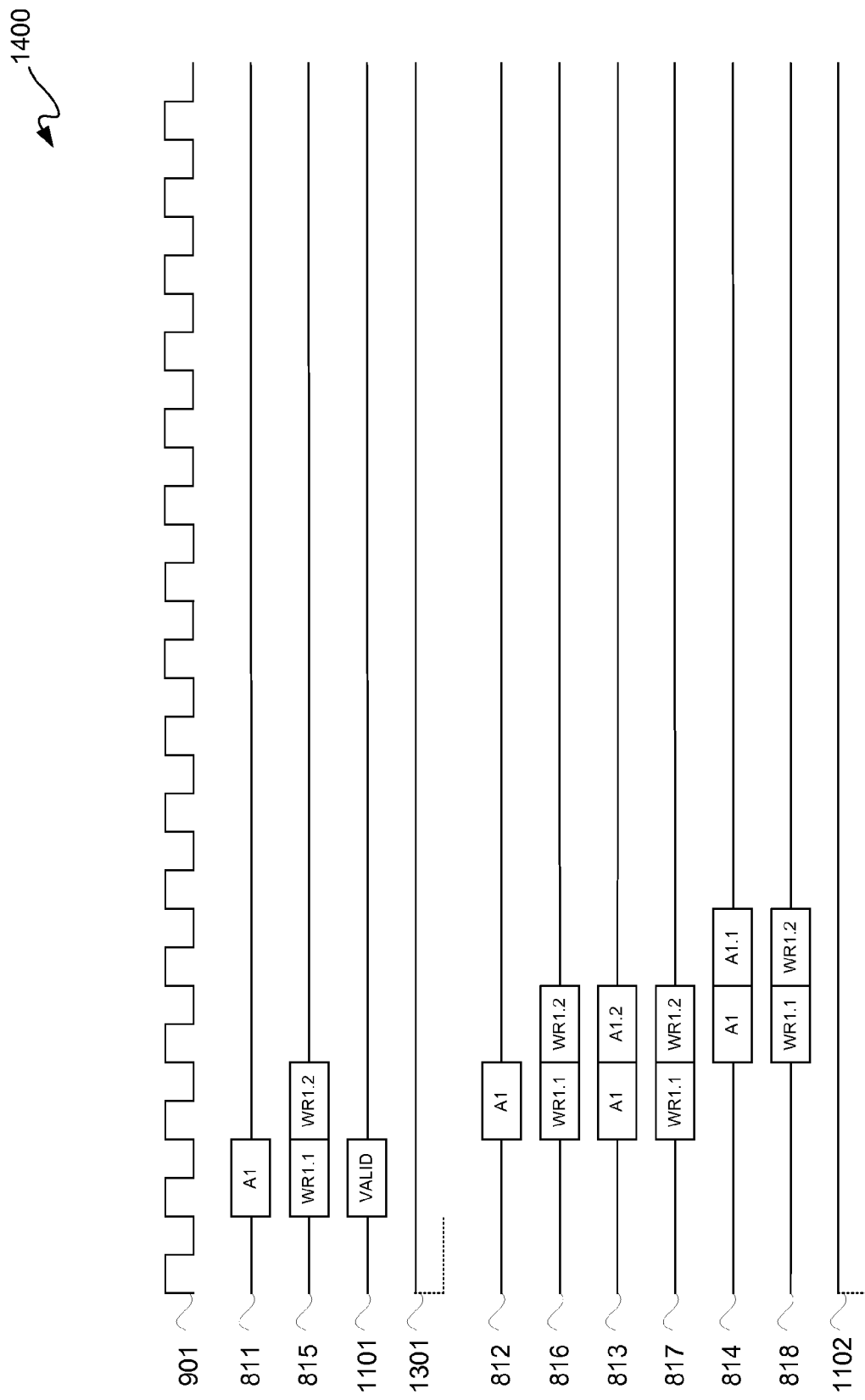

FIG. 13 is a timing diagram depicting an exemplary embodiment of a burst transfer 1400 similar to that of FIG. 12 except that it is for a burst of one. Basically, the operation described with reference to FIG. 12 is the same in FIG. 13 except that another address A1.2 follows on a next cycle from the provision of address A1 via signal 813. In other words, address A1.2 is provided in the same cycle as write data WR1.2 with respect to signals 813 and 817, respectively. Likewise, an address A1.1 follows in a next cycle from address A1 provided via signal 814 and corresponds to the same cycle in which write data WR1.2 is provided via signal 818.

It should be appreciated that a burst transfer from a PLB may be split up into two completely separate transactions by memory controller interface 212. In this example, the first line of data, namely address A1 and write data WR1.1, are sent out without any changes. However, for the second burst of data to memory controller 301, memory controller interface 212 creates a new address namely address A1.1, to go along with the second set of data, namely write data WR1.2. This created address A1.1 may be address incremented as appropriate for the transfer.

Figure 14:
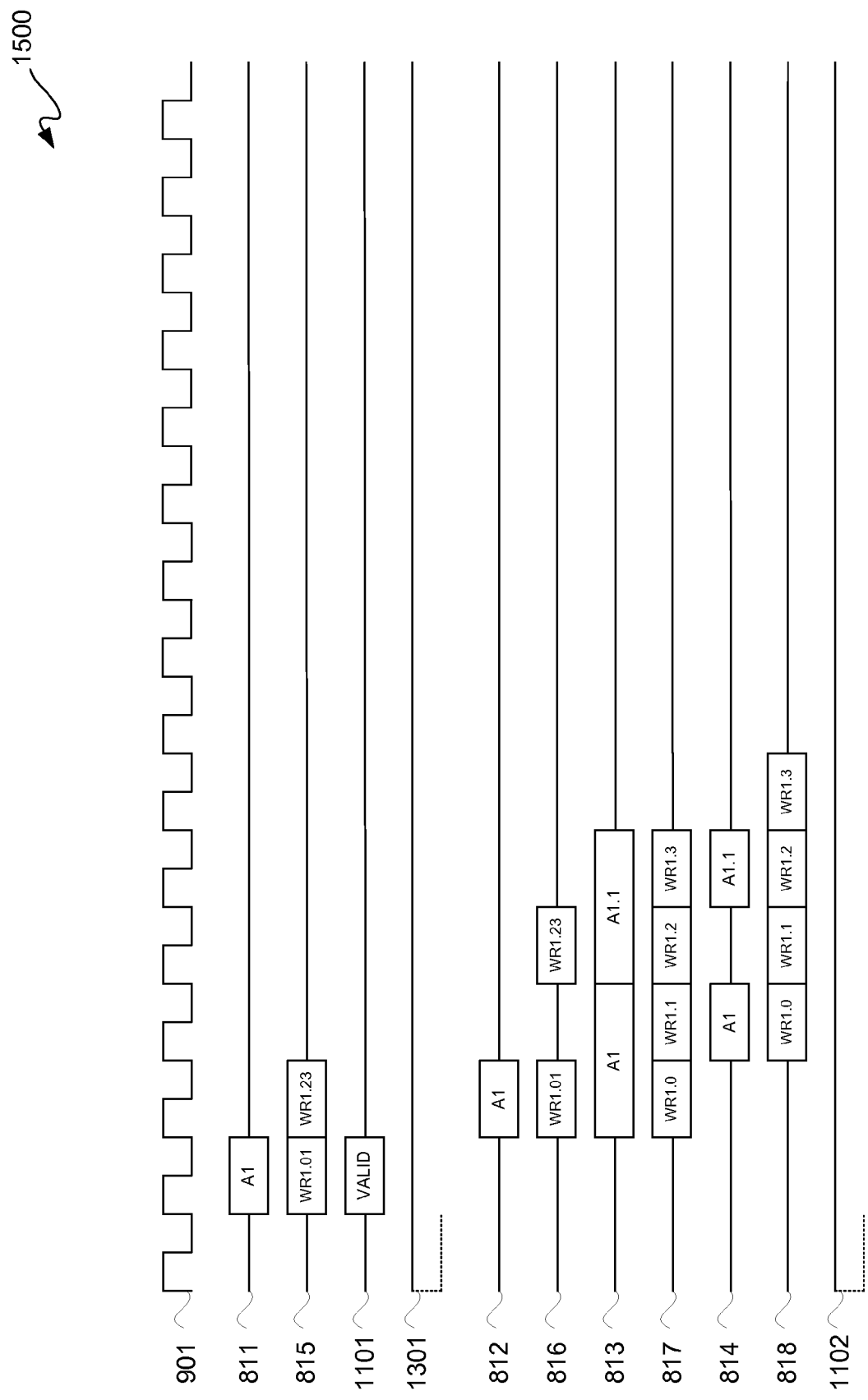

FIG. 14 is a timing diagram depicting an exemplary embodiment of a data translation operation 1500. For purposes of this example, it has been assumed that the memory interface between memory controller 301 and memory controller interface 212 is 64 bits wide and that data is processed in bursts of two, again with a PLB interface for a cache line.

In this example, a PLB requesting device sends a cache line in two 128-bit beats, beat one has data chunks 0 and 1, while beat two has data chunks 2 and 3, where each chunk of data is 64 bits. These two beats are indicated as write data WR1.01 and write data WR1.23 and are respectively provided in the same cycles as previously described with reference to write data WR1.1 and write data WR1.2 of FIG. 13 via signal 815.

When address A1 comes out of address FIFO 801 as indicated by signal 812, output controller 704 determines to create two separate bursts out of the original PLB transaction, where each of the new transactions has its data broken into smaller chunks. Address A1 provided from memory controller interface 212 to memory controller 301 to synchronizer 803 is held for two clock cycles and a subsequently created address A1.1 is held for the next two cycles, as indicated by signal 813. Thus, there is a one cycle gap between write data WR1.01 and write data WR1.23 output from write data FIFO 805 via signal 816.

Accordingly, multiplexed data provided from write data multiplexer 806 is provided in four sequential cycles for beats zero, one, two, and three in sequence as indicated by signal 817. Thus, address A1 provided from memory controller interface 212 to memory controller 301 is provided along with write data WR1.0 via signals 814 and 818 respectively, and this address is also used for the next beat of write data, namely write data WR1.1 also provided via signal 818. Address A1.1 is provided with a one cycle gap between the respective providing of addresses A1 and A1.1, as indicated by signal 814, and write data WR1.2 is provided along with address A1.1. On a next cycle, write data WR1.3 is provided, and address A1.1 is used for such write data. Thus it should be appreciated for the above example, memory controller interface 212 provides write data to memory controller 301 in 64-bit increments in four successive cycles.

Figure 15:
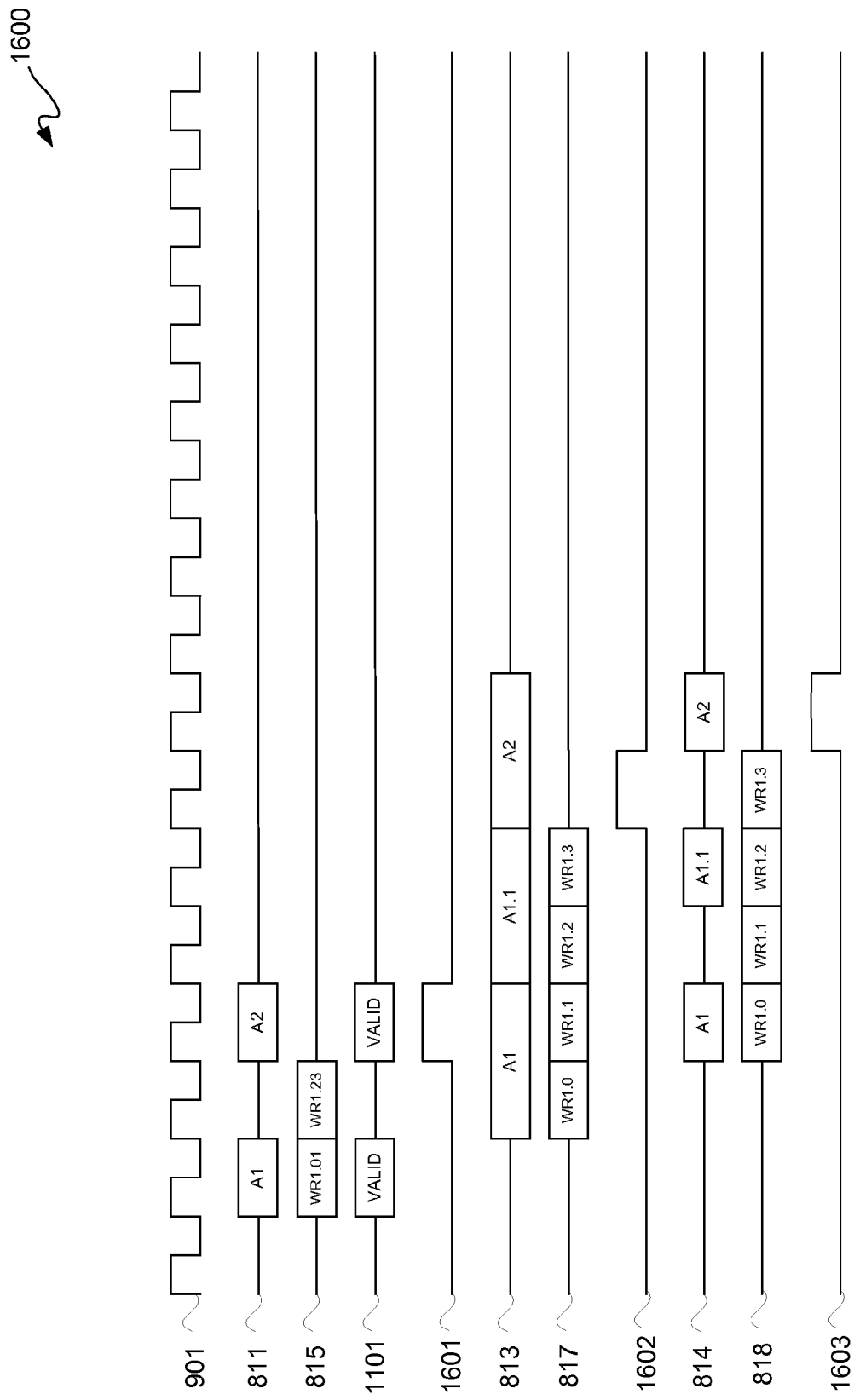

FIG. 15 is a timing diagram depicting an exemplary embodiment of a data translation operation 1600 similar to data translation operation 1500 of FIG. 15. However, in this example, a read follows the write described with reference to FIG. 14. In this example, address A2 for a read operation provided via signal 811 is provided one cycle after write data WR1.23 is provided via signal 815.

Crossbar 299 may provide a read not write signal 1601 to memory controller interface 212 to indicate that this operation is not a write but is a read. The read not write signal may be provided along with address A2 and a valid signal as previously described. Thus, on the same cycle that memory controller interface 212 provides write data WR1.3 to memory controller 301 via signal 818, memory controller interface 212 provides a read not write signal 1602 to memory controller 301 while address A2 is asserted on signal 813.

On a subsequent cycle, address A2 for a read may be provided as indicated by signal 814. Address A2 may be held for two cycles as output from address translation/match block 802 to synchronizer 803 via signal 813. A first of these cycles is taken up by the read not write provided via signal 1602 to memory controller 301 and the second or next of these cycles is taken up by address A2 provided to memory controller 301. Furthermore, in the same cycle address A2 is pulsed or asserted on signal 814, read not write signal 1603 of memory controller interface 212 may be asserted.

Figure 16:
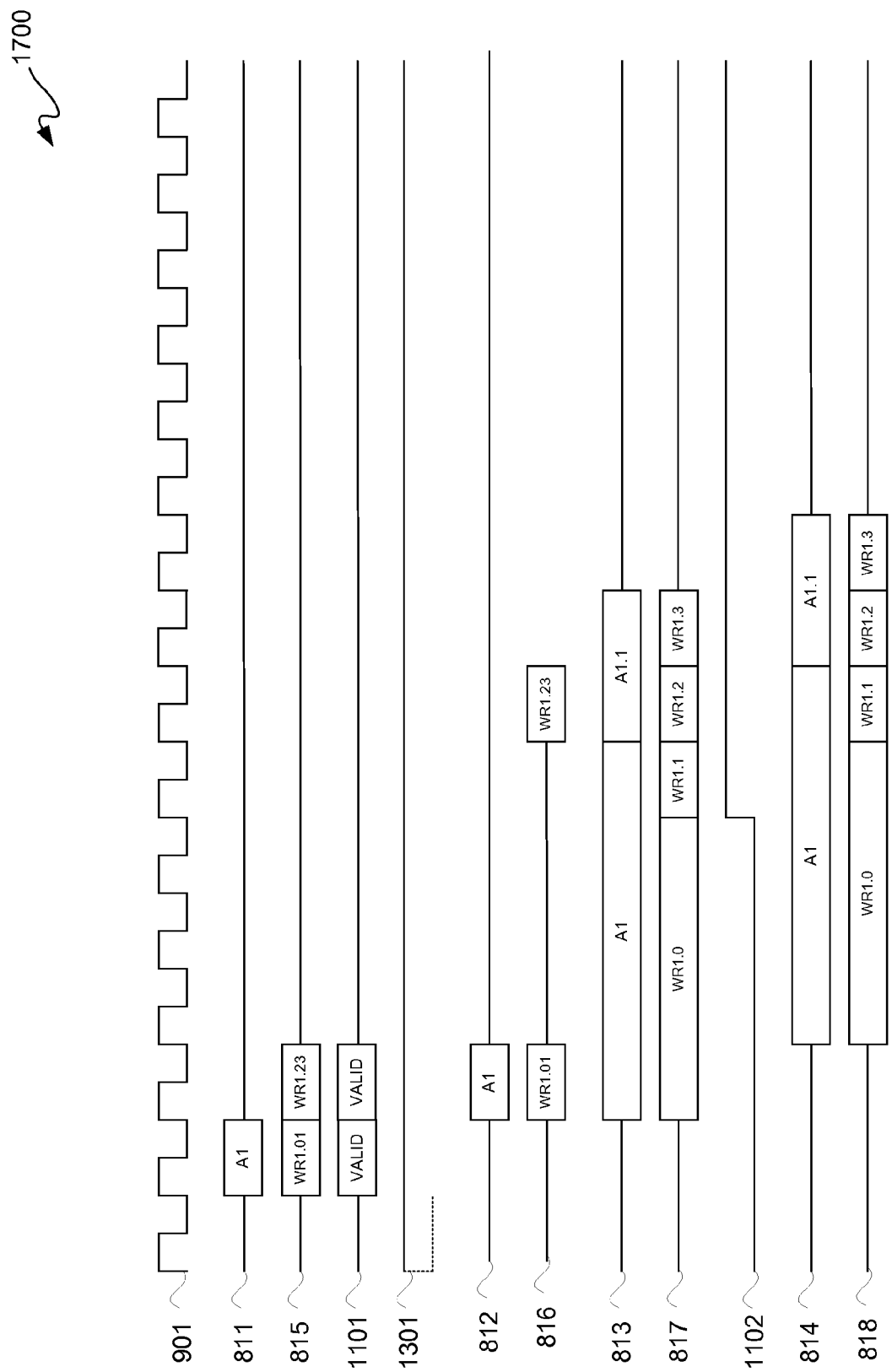

FIG. 16 is a timing diagram depicting an exemplary embodiment of a delayed burst write operation 1700. Burst write operation 1700 is similar to data translation operation 1500 of FIG. 14. However, one difference is when memory controller interface 212 is ready to provide address A1 and write data WR1.01 via signals 814 and 818 to memory controller 301, ready to accept signal 1102 has been de-asserted indicating that memory controller 301 is not ready to receive such information.

Starting with the third clock cycle, address, A1 and write data WR1.0 are extended as indicated by signals 813 and 817, respectively. Additionally, starting with the fourth clock cycle, address A1 and write data WR1.0 are extended as indicated by signals 814 and 818, respectively. Furthermore, in this example it is illustratively shown that ready to accept signal 1102 is not asserted until a sixth clock cycle; however, in this example there is a one cycle latency for memory controller interface 212 to react to the assertion of ready to accept signal 1102. It may take one or more clock cycles (not shown) for memory controller interface 212 to react to the assertion of ready to accept signal 1102 from FPGA fabric 290. Memory controller interface 212 keeps the same data and address available in the bus until the ready to accept signal 1102 is asserted. Again, once ready to accept signal 1102 is asserted, namely pulled high in this example, memory controller interface 212 starts sending the data and address information to memory controller 301.

Figure 17:
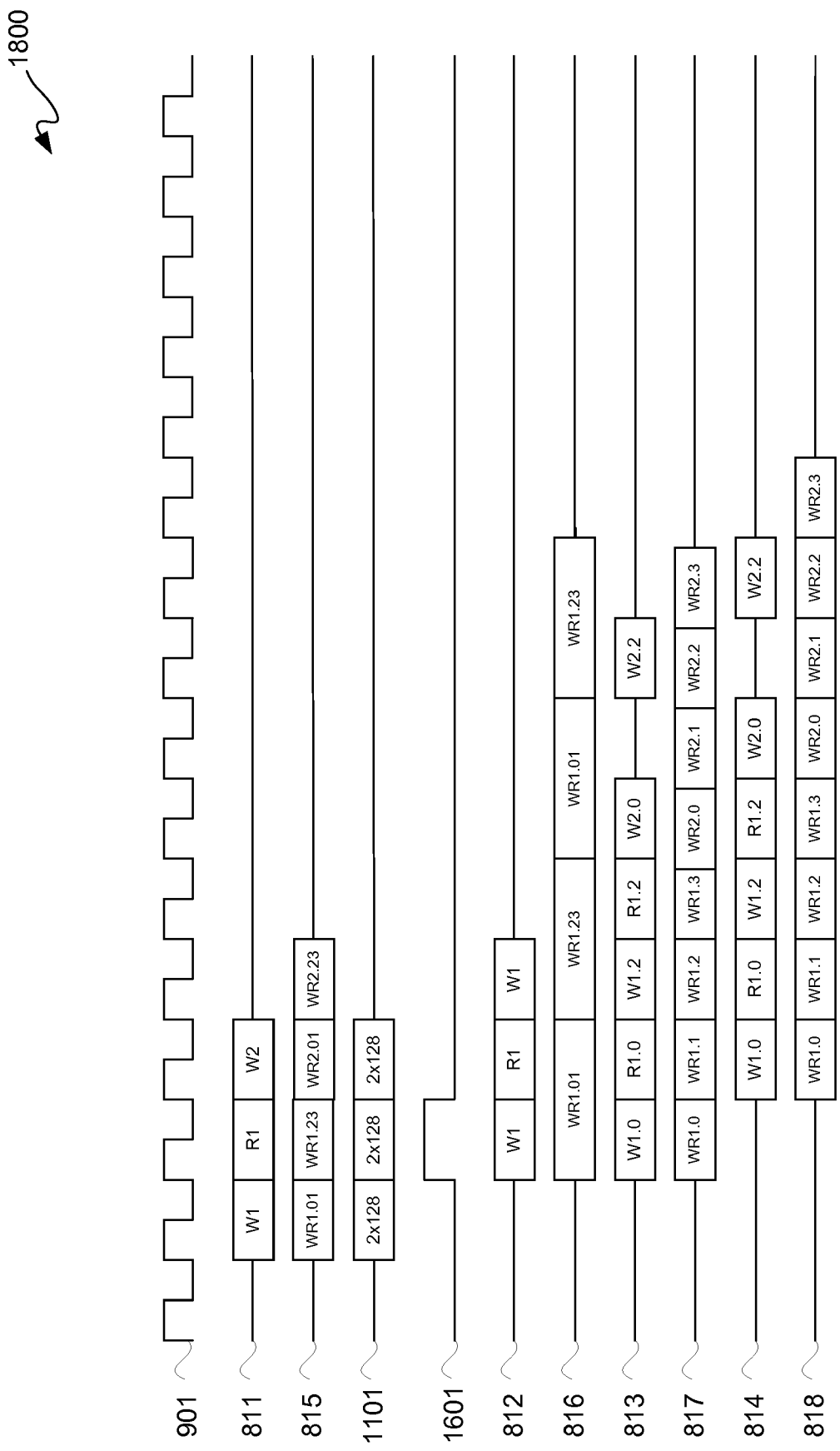

FIG. 17 is a timing diagram depicting an exemplary embodiment of a QDR burst write operation 1800. In this example, a PLB pushes a write, followed by a read, followed by another write onto memory controller interface 212, for a QDR memory device 303. Assuming that none of these write, read, and write transactions overlap an address base, memory controller interface 212 will split such transactions up into two transactions apiece for the example, as generally indicated by the 8 boxes on each of signals 817 and 818, where the memory interface is configured for bursts of two by a 64-bit width, and where PLB transactions are bursts of two by a 128-bit width. The PLB size is indicated by qualifier size signal 1101, as previously described.

Approximately immediately after the first burst of the first write goes out, a read may be sent out before the next burst for that first write transaction. In other words, read address R1.0 is "squeezed" in between write addresses 1.0 and 1.2 for example as generally indicated by signals 813 and 814. Thus, data may eventually be returned to memory controller interface 212 responsive to such read just as if such transaction was not a QDR transaction.

Figure 18:
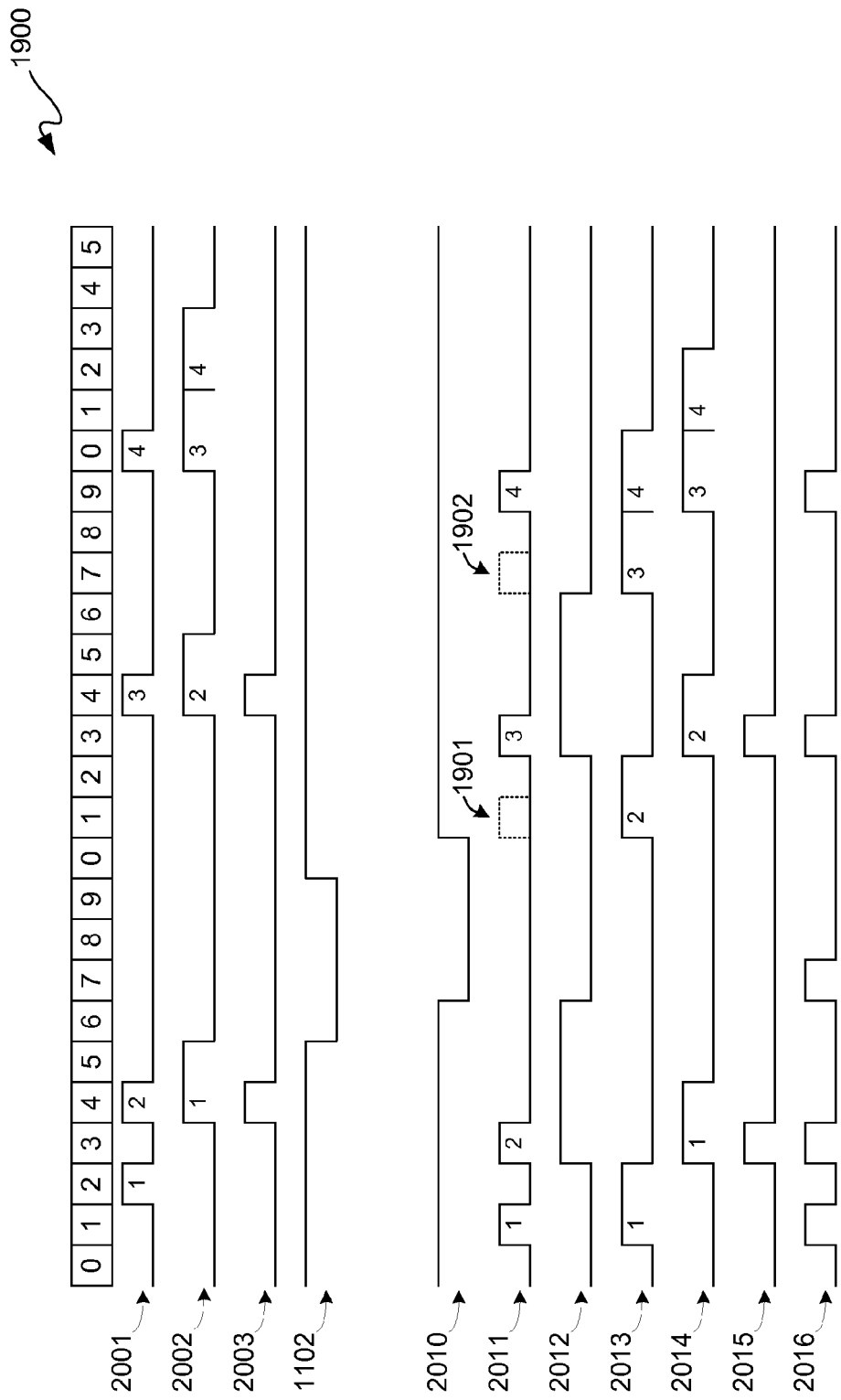

FIG. 18 is a timing diagram depicting an exemplary embodiment of an auto-stall operation 1900. More particularly, an address ready to accept signal 1102 may be toggled in relation to an address valid 2001. Signals 2001 through 2003 and address ready to accept signal 1102 are part of the interface from FPGA fabric 290, or more particularly, memory controller 301 to memory controller interface 212. Signals 2001 through 2003 and 1102 are actual signals. However, to clearly describe operation of memory controller interface 212 responsive to such external interface signals, signals 2010 through 2016 are indicated as internal control signals of memory controller interface 212. However, these signals 2010 through 2016 are not necessarily the actual details of control signals of memory controller interface 212, but rather generally represent the actual signals for purposes of clarity to make the explanation of operation of memory controller interface 212 more understandable.

Additionally, numbers 1 through 4 have been indicated on the figures for tracking the various transaction or operations relative to one another, and likewise are not described in detail for purposes of clarity and not limitation other than to indicate that they are transactions. As transactions originate with master devices, they pass through memory controller interface 212 before being passed to memory controller 301. Thus, memory controller interface 212 internal signals, such as generally indicated by signals 2011, 2014, and 2015 through 2016, respond to such transactions earlier in time than their corresponding external signals provided to memory controller 301, namely respectively signals 2001, 2002, and 2003. Likewise, signal 1102 which is a not ready signal asserted by memory controller 301 occurs earlier in time than its corresponding not ready signal 2010 of memory controller interface 212. For purposes of clarity and not limitation, transactions are described from the standpoint of memory controller 301. Thus if a cycle is called out for a transaction provided from memory controller interface 212 to memory controller 301, it should be understood that such cycle for memory controller 301 is later in time than its associated cycle in memory controller interface 212. For this example, a one clock cycle delay associated with synchronizing by synchronizers 803 and 807 is assumed as between the clock domains of memory controller interface 212 and memory controller 301.

In cycle 2, a non-conflicted transaction 1 takes place as indicated by address valid signal 2001 and conflict signal 2003 not being asserted. A non-conflicted signal means Conflict signal 2003 is to indicate whether a transaction is a conflicted transaction or a non-conflicted transaction. Examples of a conflicted transaction include: when a next address is not in the previous address bank or row; or when the current transaction and the previous transaction are not both reads or not both writes. Examples of a non-conflicted transaction include when: the current transaction is a read, the previous transaction was read; or the current transaction and the previous transaction are in the same bank/row. A write data delay ("WDD") is the amount of added delay from the time the address valid signal is asserted to the time the write data valid for that transaction is asserted. For a WDD set equal to 2, data associated with that address occurs in cycles 4 and 5 as indicated by write data valid signal 2002. For burst length set to 2 there are at least two beats of data.

In cycle 4, an address for transaction 2 is released that does have a conflict as indicated by address valid signal 2001 and conflict signal 2003 being asserted. Due to the conflict as indicated by conflict signal 2015, an internal auto-hold is asserted, namely internal auto-stall signal 2012. Auto-stall signal 2012 is asserted for four cycles in this example.

Because conflict signal 2015 is asserted, and thus conflict signal 2003 is asserted, memory controller 301 may lower ready to accept signal 1102, for example two cycles later at cycle 6. In response, ready to accept signal 2010 may be lowered, namely one clock cycle later at cycle 7 in this example.

Ready window signal 2016 indicates the time at which memory controller interface 212 "looks" at address ready to accept signal 1102. A logic high pulse of ready window signal 2016 indicates a window of time in which ready to accept signal 1102 is sampled. If the external address ready to accept signal 1102 does not become deasserted during a window of internal ready window signal 2016, memory interface controller 212 will start and finish a transaction. The internal ready window signal 2016 is used to make sure that once a transaction starts, there is no mechanism in which it can be cancelled or split.

Transaction 3 occurs in cycle 14 as indicated by address valid signal 2001. In cycle 14, conflict signal 2003 is asserted. However, in this example memory, controller 301 does not toggle ready to accept signal 1102 in response to the assertion of conflict signal 2015. Therefore, memory controller interface 212 presents a next address, which in this example six cycles later, namely the four cycles for the auto-stall and two cycles for the burst length, as indicated by transaction 4 of address valid signal 2001 at clock cycle 20. For transaction 4 there is no conflict as indicated by conflict signal 2003 not being asserted in cycle 20, and thus data associated with transaction 4 is presented later, which in this example is two cycles after address valid signal 2001 is asserted.

There are two pulses, namely pulses 1901 and 1902, which are illustratively shown with dashed boxes. These pulses 1901 and 1902 indicate where respective next address phases should have started, but do not start due to delay. More particularly, it shows where the address phase would have taken place had it not been for an auto-stall condition caused by assertion of auto-stall signal 2012.

Figure 19:
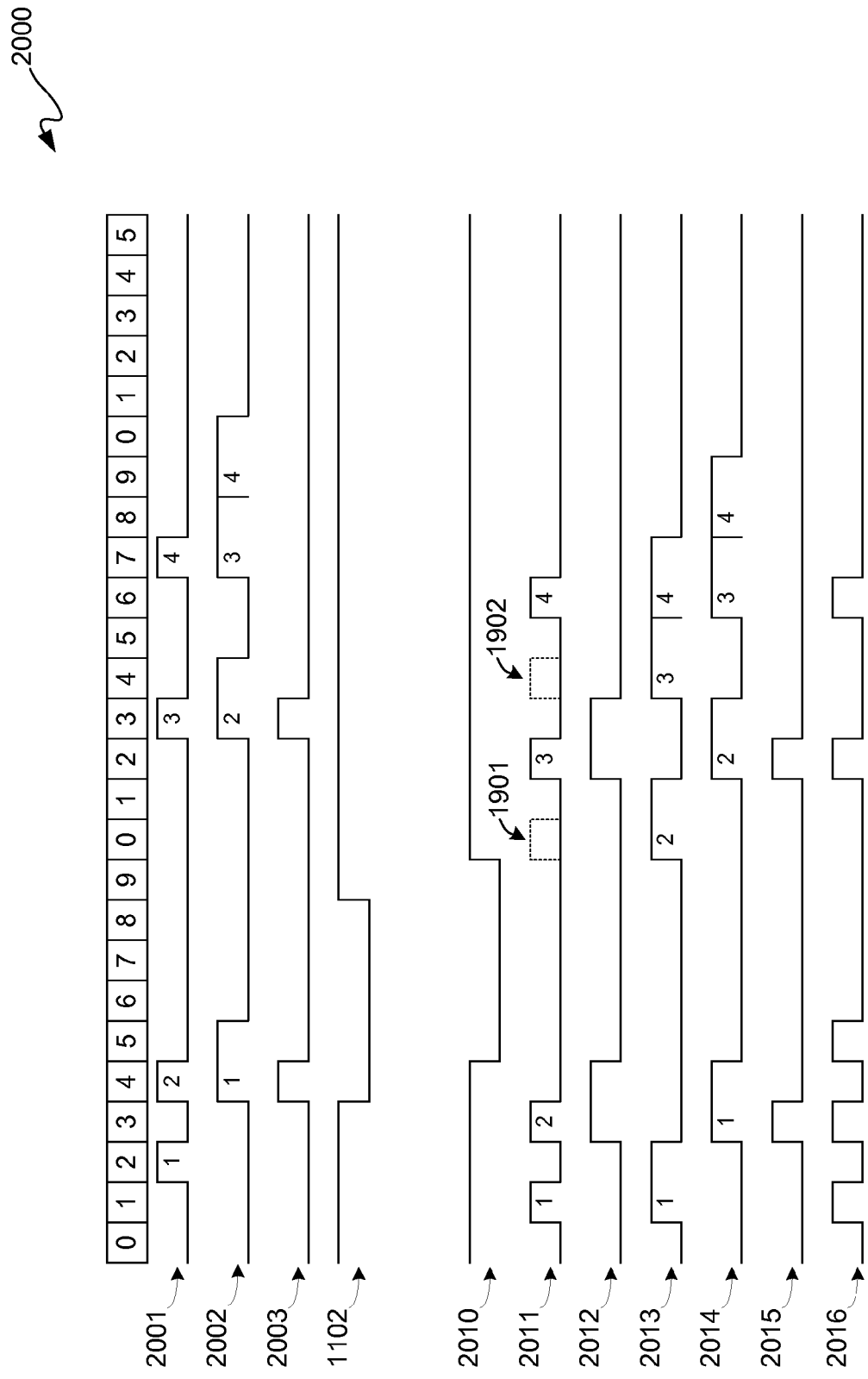

FIG. 19 is a timing diagram depicting an exemplary embodiment of an auto-stall condition 2000 for a burst length equal to 2 and a WDD equal to 2. In this example, it should be appreciated that the auto-stall value may be set to 0. If memory controller 301 has a combinational path from the conflict bits to the ready to accept signal 1102, memory controller 301 may more readily react to assertion of conflict signal 2015.

In this example, transaction 1 starting in cycle 2 is the same as described in FIG. 18. Transaction 2 starts at cycle 4 starts as it did in FIG. 18; however, memory controller 301 de-asserts ready to accept signal 1102 in the same cycle that transaction 2 starts. In this example, the auto-stall is set to 0, and thus ready window signal 2016 is much closer in time to transaction 2's address valid signal 2011. In FIG. 18, signal 2016 was asserted in cycle 7, and in FIG. 19 signal 2016 is asserted in cycle 5, so it is 2 cycles earlier or closer.

By having auto-stall set to 0, transactions may occur earlier than in the example of FIG. 18. For example, ready to accept signal 1102 may be asserted earlier, and thus de-asserted earlier, namely respectively at cycles 4 and 8 instead of at cycles 6 and 9 as in FIG. 18. Thus, a next transaction may begin sooner, in this example transaction 3 starts in cycle 13 as indicated by address valid signal 2001. The length of ready to accept signal 1102 being de-asserted in FIG. 19 is five cycles, while the length of time ready to accept signal 1102 is de-asserted in FIG. 18 is four cycles. Thus, the number of cycles that a ready to accept signal 1102 is asserted or not asserted, may be changed to suit a user's application.

In FIG. 19, the space between transactions 3 and 4 has been reduced from that in FIG. 18. In other words, in FIG. 19, the distance from cycle 13 to cycle 17 is four cycles as respectively associated with transactions 3 and 4. The four cycles may be thought of as resulting from auto-stall being set to 0, which translates to two cycles of delay plus two cycles of burst length for this example. Transaction 4 is the same as in FIG. 18, other than it starts earlier in FIG. 19 than in FIG. 18, namely at cycle 17 instead of cycle 20 as in FIG. 18.

Figure 20:
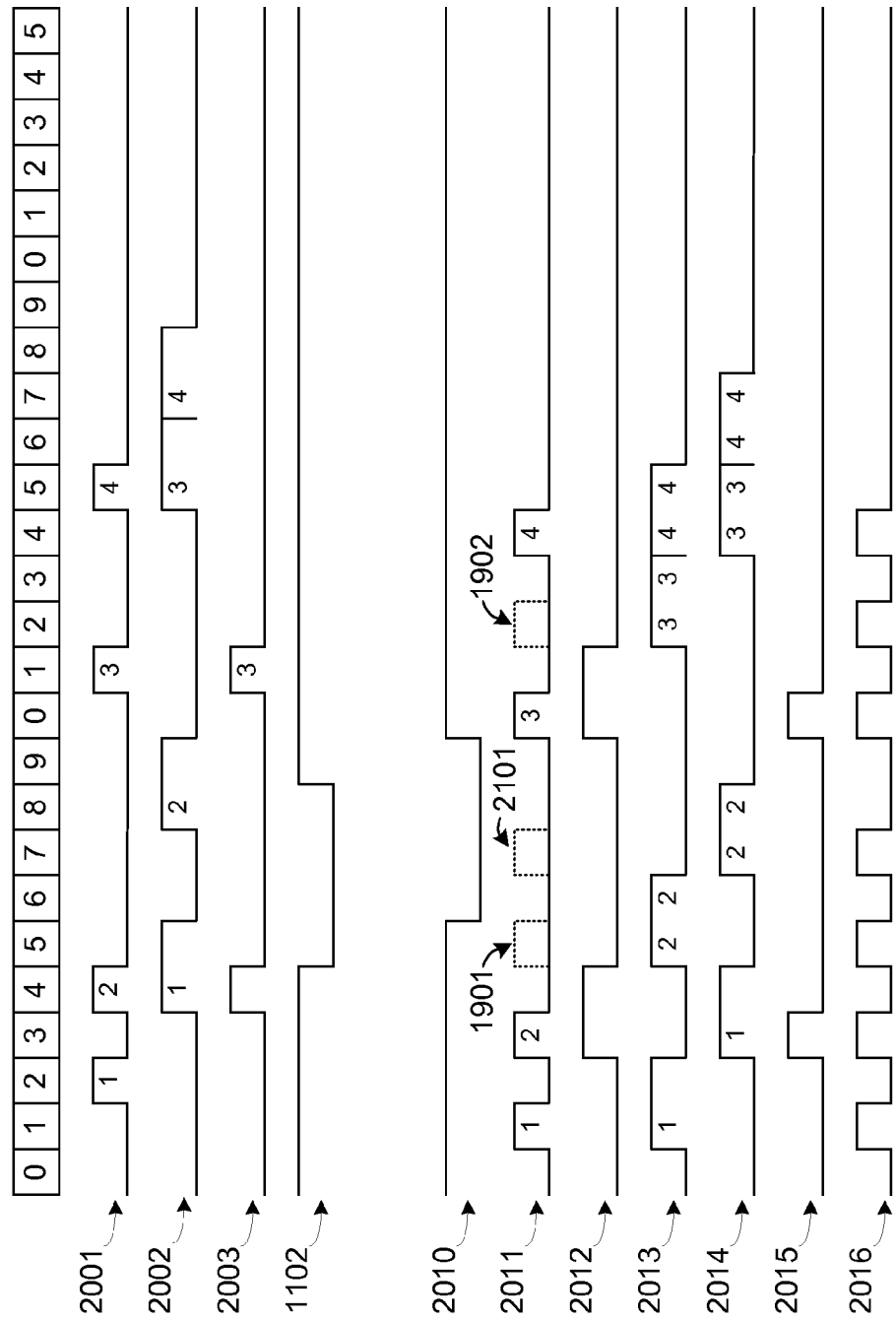

FIG. 20 is a timing diagram depicting an exemplary embodiment of a missed ready to accept operation 2100. If there is a combinatorial path between conflict signal 2015 and address ready to accept signal 1102, address ready to accept signal 2010 is de-asserted in the cycle after conflict signal 2003 is asserted. Accordingly, address ready to accept signal 2010 in the next cycle after de-assertion of address ready to accept signal 1102 is likewise de-asserted, namely in cycle 6 in this example. However, ready window signal 2016 which is asserted in cycle 5 in this example, indicating an end of an auto-stall period.

Accordingly, memory controller interface 212 may assume that it is okay to finish transaction 1 and send out the results of the entire transaction to a requesting master device such as in FPGA fabric 290. However, perhaps address ready to accept signal 1102 was de-asserted due to unavailability of a memory device 303, such as a refresh cycle of DRAM. Thus, a potential cycle, as generally indicated by dashed pulse 2101 in cycle 7, is when a next transaction would have gone out but for the address ready to accept signal 1102 being de-asserted. In other words, if address ready to accept signal 1102 was not de-asserted, the next transaction would have gone out in cycle 7 in this example. However, because ready window signal 2016 is valid during the cycle, namely cycle 7 in this example, and address ready to accept 2010 is de-asserted internally within memory controller interface 212, memory controller interface 212 does not send out the next transaction, namely transaction 3, but waits. In this example, transaction 3 is sent out in cycle 10. When address ready to accept signal 2010 is released or asserted, namely transitions to a logic high state, the next set of transactions are set out as previously described. Even though the ready to accept signal 1102 is immediately after transaction 2's address valid, signal 1102 is not early enough to extend the autostall period for transaction 2. Therefore, the assertion of data signal 2002, occurred as if ready to accept signal 1102 signal was not deasserted. In summary, even though the deassertion of ready to accept signal 1102 is near transaction 2, such deassertion has no affect on transaction 2.

Figure 21:
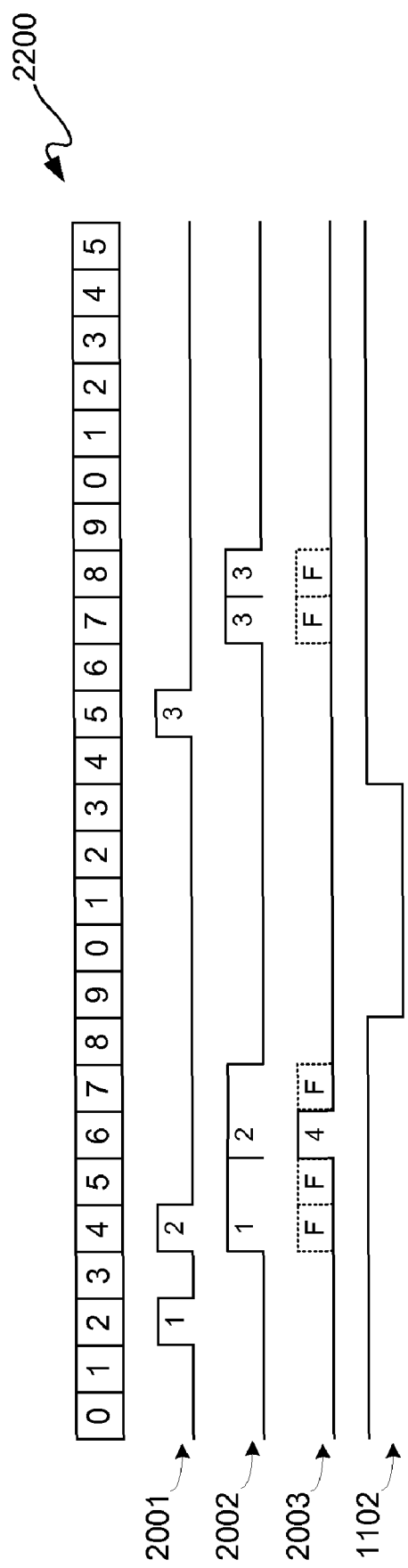

FIG. 21 is a timing diagram depicting an exemplary embodiment of a read modify write operation 2200. If a ready modify write bit is set in a control register of memory controller interface 212, then read modify write operation 2200 is performed. For the example, it shall be assumed that the burst length is equal to two and the burst width is equal to 32 bits, with WDD again equal to two.

Because data width is 32 bits for this example, four bits of byte enable are used. The notation "F" in FIG. 21 indicates that all bytes are being written. The "4" in cycle 6 indicates that only one byte is being written.

In cycle 2, a transaction 1 is issued whose data phase is complete at the end of cycle 5. In cycle 4, transaction 2 begins, but the first beat has only one byte being written. Therefore, an auto-hold off signal, such as auto-stall signal 2012 of FIG. 18, is asserted. Two cycles after the last byte enable for transaction 2, memory controller 301 de-asserts ready to accept signal 1102 at cycle 9. Responsive to de-assertion of ready to accept signal 1102, memory controller interface 212 stops issuing new transactions to memory controller 301. After memory controller 301 releases ready to accept signal 1102, namely at cycle 14, memory controller interface 212 begins issuing transactions after clock cycle 14, such as transaction 3 at clock cycle 15.

From the above description, it should be appreciated that ready to accept signal 1102 is asserted by memory controller 301 to indicate that it is ready to accept another transaction from memory controller interface 212. Once ready to accept signal 1102 is asserted by memory controller 301, memory controller interface 212 releases the next transaction to FPGA fabric 290. There are two instances in which memory controller interface 212 uses address ready to accept signal 1102 in its state machines. The first instance is at the beginning of a transaction. The second instance is at the end of an auto-stall period. Recall that windows, namely internal windows of memory controller interface 212, may be used.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A memory controller interface, comprising:
a processor block core embedded in a host integrated circuit having programmable resources for communication with a memory controller;
the memory controller being instantiated in the programmable resources;
the memory controller interface including:
an output path including a first processor block interface, an address queue, a write data queue, and a first translation circuit;
the first processor block interface coupled to receive address input and data input;
the address input being provided from the processor block interface to the address queue;
the data input being provided from the processor block interface to the write data queue;
the first translation circuit coupled to receive the address input from the address queue and coupled to receive the write data input from the write data queue, wherein the first translation circuit is configured to translate the write data from an internal data width to a width of a write bus coupled thereto;
an input path including a second processor block interface, a read data queue and a second translation circuit;
the input path coupled to receive read data via the memory controller for the second translation circuit;
the second translation circuit coupled to provide the read data to the read data queue, wherein the second translation circuit is configured to translate the read data from an external data width of a read bus to the internal data width; and
the read data queue coupled to provide the read data to the second processor block interface for output therefrom.

2. The memory controller interface according to claim 1, wherein:
the first processor block interface is a Processor Local Bus input interface; and
the second processor block interface is a Processor Local Bus output interface.

3. The memory controller interface according to claim 2, wherein the programmable resources are programmable logic, and wherein:

buses instantiated in the programmable logic for communication between the memory controller and the memory controller interface are user selectable from a set of supported bit widths for the memory controller;

the first translation circuit configured to translate the write data from an internal data width to a width of a write bus of the buses; and the second translation circuit configured to translate the read data from an external data width of a read bus of the buses to the internal data width.

4. The memory controller interface according to claim 3, wherein the internal data width is 128 bits; and wherein each of the width of the write bus and the external data width of the read bus are user selectable from the set of supported bit widths.

5. The memory controller interface according to claim 4, wherein the set of supported bit widths are 32 bits, 64 bits, and 128 bits.

6. The memory controller interface according to claim 5, wherein for the bit widths of 32 bits and 64 bits, the output translation circuit is configured to increase external write burst length; and the input translation circuit is configured to accumulate bursts to decrease internal read burst length.

7. The memory controller interface according to claim 1, further comprising:

a first synchronizer coupled to receive the address input from the first translation circuit for providing to the memory controller;

a second synchronizer coupled to receive the write data input from the first translation circuit for providing to the memory controller; and a third synchronizer coupled to receive the read data from the memory controller for providing to the second translation circuit.

8. The memory controller interface according to claim 1, wherein the write data is being provided to the memory controller using a transfer type selected from a group consisting of a burst transfer, a line transfer, a single transfer, a combination of the burst transfer and one or more single transfers.

9. The memory controller interface according to claim 1, further comprising control circuitry configured to automatically enter a stall mode of the memory controller interface.

10. The memory controller interface according to claim 9, wherein the stall mode is automatically assert for an address overlap between a write transfer and a read transfer immediately following the write transfer.

11. The memory controller interface according to claim 9, wherein the stall mode is automatically assert for a read-modify-write sequence of operations.

12. The memory controller interface according to claim 9, wherein the stall mode is automatically assert for missing in a sampling window of the memory controller interface assertion of a not ready signal from the memory controller.

* * * * *